United States Patent
Wei et al.

(10) Patent No.: US 10,341,072 B2
(45) Date of Patent: Jul. 2, 2019

(54) ELEVATION PMI REPORTING ON PUCCH

(71) Applicant: QUALCOMM Incorporated, San Diego, CA (US)

(72) Inventors: Chao Wei, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/513,713

(22) PCT Filed: Sep. 30, 2015

(86) PCT No.: PCT/CN2015/091177
§ 371 (c)(1),
(2) Date: Mar. 23, 2017

(87) PCT Pub. No.: WO2016/074542
PCT Pub. Date: May 19, 2016

(65) Prior Publication Data
US 2017/0310441 A1    Oct. 26, 2017

(30) Foreign Application Priority Data
Nov. 10, 2014 (WO) ................ PCT/CN2014/090680

(51) Int. Cl.
*H04B 7/00* (2006.01)
*H04L 5/00* (2006.01)
(Continued)

(52) U.S. Cl.
CPC ......... *H04L 5/0048* (2013.01); *H04B 7/0486* (2013.01); *H04B 7/063* (2013.01);
(Continued)

(58) Field of Classification Search
CPC .... H04W 72/04; H04W 72/046; H04W 88/08
(Continued)

(56) References Cited

U.S. PATENT DOCUMENTS

| 8,885,746 B2 * | 11/2014 | Moulsley | H04B 7/0408 375/267 |
| 8,903,006 B2 * | 12/2014 | Ko | H04B 7/0626 370/241 |

(Continued)

FOREIGN PATENT DOCUMENTS

| CN | 103634085 A | 3/2014 |
| EP | 2890023 A1 | 7/2015 |

(Continued)

OTHER PUBLICATIONS

3GPP TS 36.213: "3rd Generation Partnership Project, Technical Specification Group Radio Access Network, Evolved Universal Terrestrial Radio Access (E-UTRA), Physical layer procedures (Release 12)", 3GPP Standard, 3rd Generation Partnership Project (3GPP), Mobile Competence Centre, 650, Route Des Lucioles, F-06921 Sophia-Antipolis Cedex, France vol. RAN WG1, No. V12.2.0, Jun. 30, 2014 (Jun. 30, 2014), pp. 1-207, section 5.1.2.

(Continued)

*Primary Examiner* — Dmitry Levitan
(74) *Attorney, Agent, or Firm* — Anthony R. Morris

(57) ABSTRACT

In an aspect of the disclosure, a method, a computer-readable medium, and an apparatus are provided. The apparatus may be a UE. The UE receives RSs from a base station. The UE determines, based on the RSs, a second CSI indicator indicating a first precoding configuration of the base station optimized to at least one of improve signal power or reduce interference in an elevation dimension. The UE determines, based on the RSs, a second CSI indicator indicating a second precoding configuration of the base station optimized to at least one of improve the signal power or reduce interference in an azimuth dimension. The UE transmits, to the base station, a first CSI report including at least the first CSI indicator.

22 Claims, 27 Drawing Sheets

(51) Int. Cl.
*H04L 1/00* (2006.01)
*H04L 1/18* (2006.01)
*H04B 7/06* (2006.01)
*H04B 7/0456* (2017.01)
*H04W 72/04* (2009.01)
*H04W 88/02* (2009.01)
*H04W 88/08* (2009.01)

(52) U.S. Cl.
CPC ......... *H04B 7/0626* (2013.01); *H04B 7/0632* (2013.01); *H04B 7/0639* (2013.01); *H04L 1/0026* (2013.01); *H04L 1/1812* (2013.01); *H04W 72/0413* (2013.01); *H04W 88/02* (2013.01); *H04W 88/08* (2013.01); *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/146* (2018.01); *Y02D 70/444* (2018.01)

(58) Field of Classification Search
USPC ........ 370/310, 328, 334, 341, 349, 437, 465
See application file for complete search history.

(56) References Cited

U.S. PATENT DOCUMENTS

| | | | | |
|---|---|---|---|---|
| 8,913,682 | B2* | 12/2014 | Nam | H04B 7/0469 375/267 |
| 9,059,878 | B2* | 6/2015 | Thomas | H04L 25/03949 |
| 9,119,209 | B2* | 8/2015 | Nam | H04W 72/046 |
| 9,179,332 | B2* | 11/2015 | Hammarwall | H04B 7/0626 |
| 9,331,386 | B2* | 5/2016 | Wernersson | H01Q 3/00 |
| 9,357,405 | B2* | 5/2016 | Seo | H04J 11/0053 |
| 9,794,817 | B2* | 10/2017 | Ko | H04B 7/0626 |
| 9,838,106 | B2* | 12/2017 | Liu | H04B 7/0626 |
| 9,876,548 | B2* | 1/2018 | Vook | H04B 7/0478 |
| 9,912,430 | B2* | 3/2018 | Sayana | H04J 3/1694 |
| 10,020,859 | B2* | 7/2018 | Prasad | H04B 7/0452 |
| 10,084,523 | B2* | 9/2018 | Kim | H04B 7/0417 |
| 2013/0051321 | A1 | 2/2013 | Barbieri et al. | |
| 2013/0329649 | A1 | 12/2013 | Wernersson et al. | |
| 2014/0198750 | A1* | 7/2014 | Prasad | H04B 7/0626 370/329 |
| 2015/0078472 | A1* | 3/2015 | Vook | H04B 7/0617 375/267 |
| 2017/0222708 | A1* | 8/2017 | Kang | H04B 7/0617 |

FOREIGN PATENT DOCUMENTS

WO 2013144360 A1 10/2013
WO 2014032566 A1 3/2014

OTHER PUBLICATIONS

3GPP TS 36.213: "3rd Generation Partnership Project, Technical Specification Group Radio Access Network, Evolved Universal Terrestrial Radio Access (E-UTRA), Physical layer procedures (Release 12)", 3GPP Standard, 3rd Generation Partnership Project (3GPP), Mobile Competence Centre, 650, Route Des Lucioles, F-06921 Sophia-Antipolis Cedex, France vol. RAN WG1, No. V12.2.0, Jun. 30, 2014 (Jun. 30, 2014), pp. 1-207, XP050774487, [retrieved on Jun. 30, 2014], the whole document.
International Search Report and Written Opinion—PCT/CN2015/091177—ISA/EPO—dated Jan. 13, 2016.
International Search Report and Written Opinion—PCT/CN2014/090680—ISA/EPO—dated Aug. 14, 2015.
Supplementary Partial European Search Report—EP15858229—Search Authority—Munich—dated Jun. 15, 2018.

* cited by examiner

ELEVATION PMI REPORTING ON PUCCH

CROSS-REFERENCE TO RELATED APPLICATION(S)

This application is a national stage entry of PCT Application Serial No. PCT/CN2015/091177, entitled "ELEVATION PMI REPORTING ON PUCCH" and filed on Sep. 30, 2015, which claims priority to PCT Application No. PCT/CN2014/090680, entitled "ELEVATION PMI REPORTING ON PUCCH" and filed on Nov. 10, 2014, each of which are expressly incorporated by reference herein in their entirety.

BACKGROUND

Field

The present disclosure relates generally to communication systems, and more particularly, to a technique of reporting elevation precoding matrix indicator (PMI) on a physical uplink control channel (PUCCH) for a vertical antenna array.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, according to an example, a method of wireless communication of a user equipment (UE) is provided. The method includes receiving reference signals (RSs) from a base station. The method also includes determining, based on the RSs, a first channel state information (CSI) indicator indicating a first precoding configuration of the base station optimized to at least one of improve signal power or reduce interference in an elevation dimension. The method further includes determining, based on the RSs, a second CSI indicator indicating a second precoding configuration of the base station optimized to at least one of improve the signal power or reduce interference in an azimuth dimension. The method yet further includes transmitting, to the base station, a first CSI report including at least the first CSI indicator.

According to an example, an apparatus for wireless communication is provided. The apparatus may be a UE. The apparatus includes means for receiving RSs from a base station. The apparatus also includes means for determining, based on the RSs, a second CSI indicator indicating a first precoding configuration of the base station optimized to at least one of improve signal power or reduce interference in an elevation dimension. The apparatus further includes means for determining, based on the RSs, a second CSI indicator indicating a second precoding configuration of the base station optimized to at least one of improve the signal power or reduce interference in an azimuth dimension. The apparatus yet includes means for transmitting, to the base station, a first CSI report including at least the first CSI indicator.

According to an example, an apparatus for wireless communication is provided. The apparatus may be a UE. The apparatus includes a memory and at least one processor coupled to the memory and configured to receive RSs from a base station. The at least one processor is further configured to determine, based on the RSs, a second CSI indicator indicating a first precoding configuration of the base station optimized to at least one of improve signal power or reduce interference in an elevation dimension. The at least one processor is further configured to determine, based on the RSs, a second CSI indicator indicating a second precoding configuration of the base station optimized to at least one of improve the signal power or reduce interference in an azimuth dimension. The at least one processor is further configured to transmit, to the base station, a first CSI report including at least the first CSI indicator.

According to an example, a computer-readable medium storing computer executable code for wireless communication at a UE is provided. The computer-readable medium includes code for receiving RSs from a base station. The computer-readable medium also includes code for determining, based on the RSs, a second CSI indicator indicating a first precoding configuration of the base station optimized to at least one of improve signal power or reduce interference in an elevation dimension. The computer-readable medium further includes code for determining, based on the RSs, a second CSI indicator indicating a second precoding configuration of the base station optimized to at least one of improve the signal power or reduce interference in an azimuth dimension. The computer-readable medium yet further includes code for transmitting, to the base station, a first CSI report including at least the first CSI indicator.

DETAILED DESCRIPTION

Figure 1:
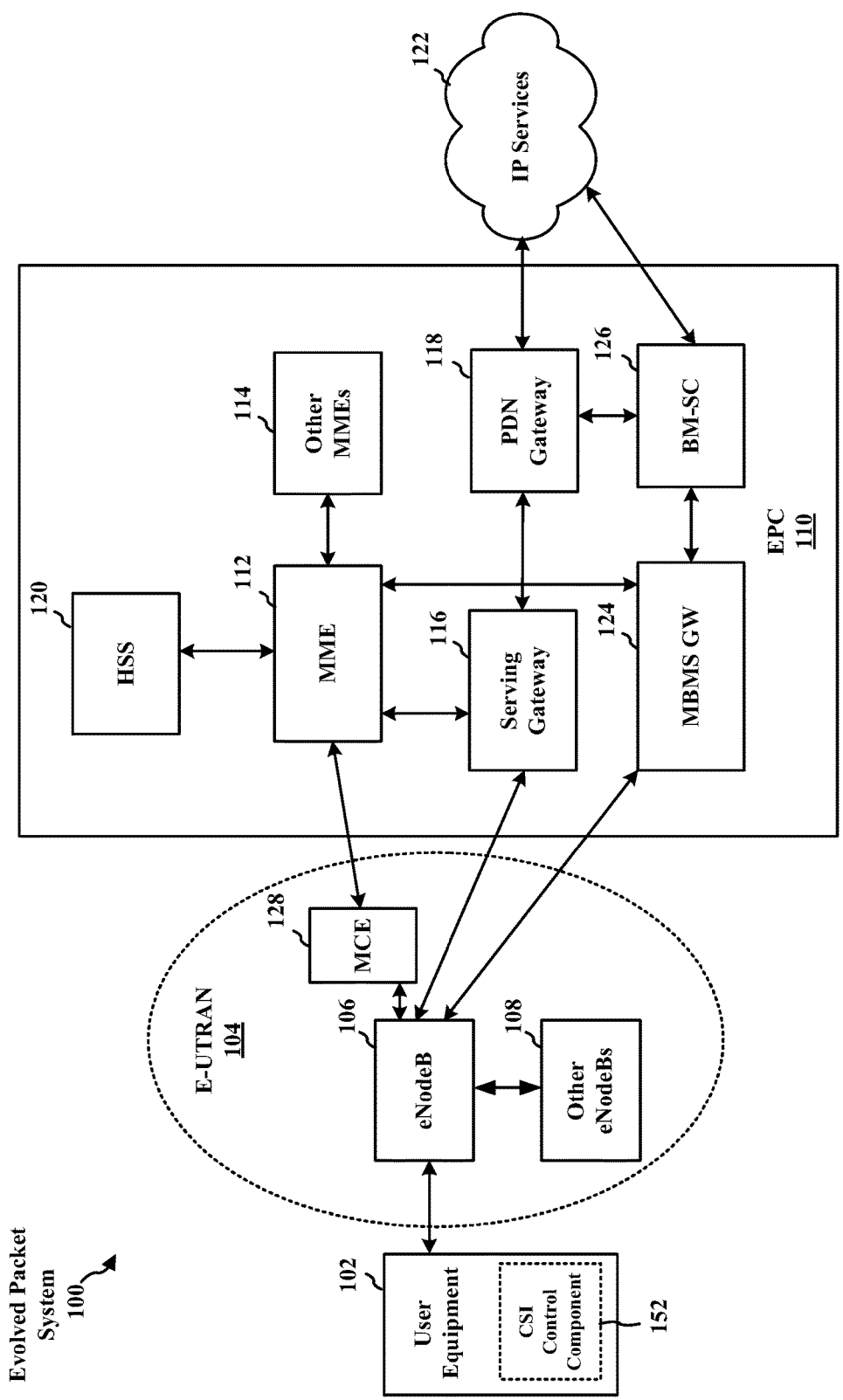
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In certain configurations, the UE 102 may include a CSI control component 152. The CSI control component 152 may control a process of receiving RSs from a base station. The CSI control component 152 may control a process of determining, based on the RSs, a second CSI indicator indicating a first precoding configuration of the base station optimized to at least one of improve signal power or reduce interference in an elevation dimension. The CSI control component 152 may control a process of determining, based on the RSs, a second CSI indicator indicating a second precoding configuration of the base station optimized to at least one of improve the signal power or reduce interference in an azimuth dimension. The CSI control component 152 may control a process of transmitting, to the base station, a first CSI report including at least the first CSI indicator.

Figure 2:
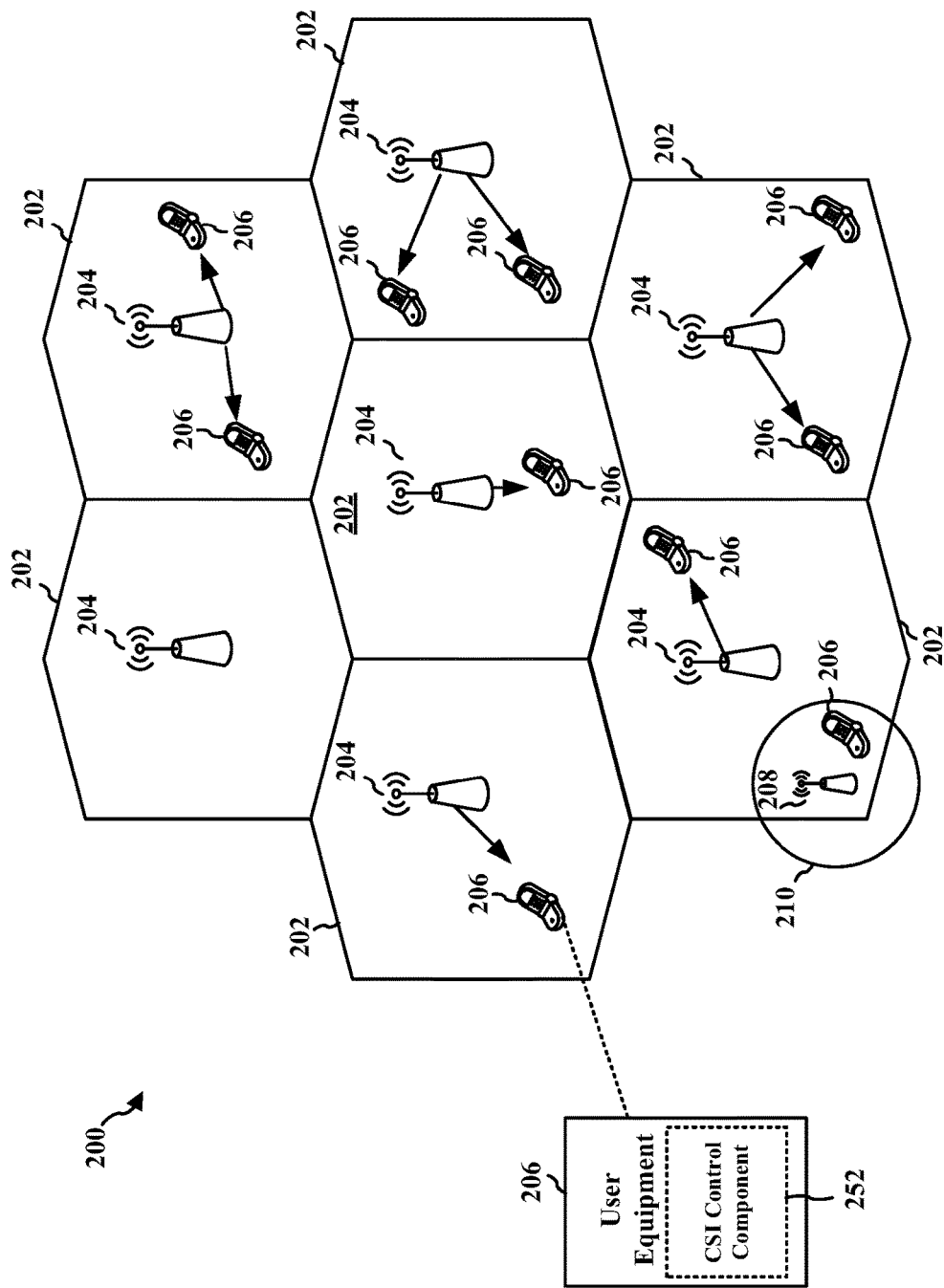
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

In certain configurations, the UE 206 may include a CSI control component 252. The CSI control component 252 may control a process of receiving RSs from a base station. The CSI control component 252 may control a process of determining, based on the RSs, a second CSI indicator indicating a first precoding configuration of the base station optimized to at least one of improve signal power or reduce interference in an elevation dimension. The CSI control component 252 may control a process of determining, based on the RSs, a second CSI indicator indicating a second precoding configuration of the base station optimized to at least one of improve the signal power or reduce interference in an azimuth dimension. The CSI control component 252 may control a process of transmitting, to the base station, a first CSI report including at least the first CSI indicator.

Figure 3:
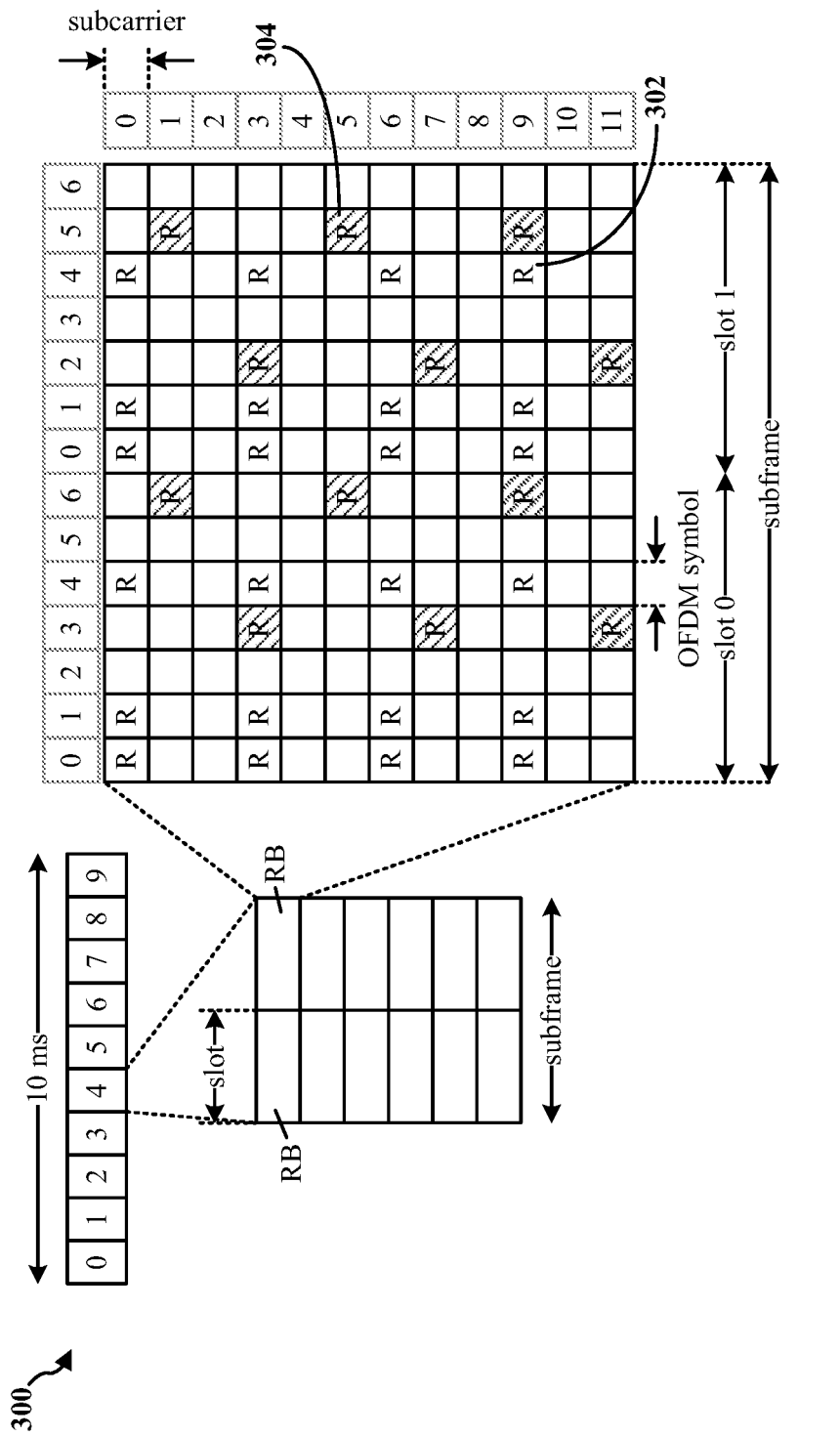
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
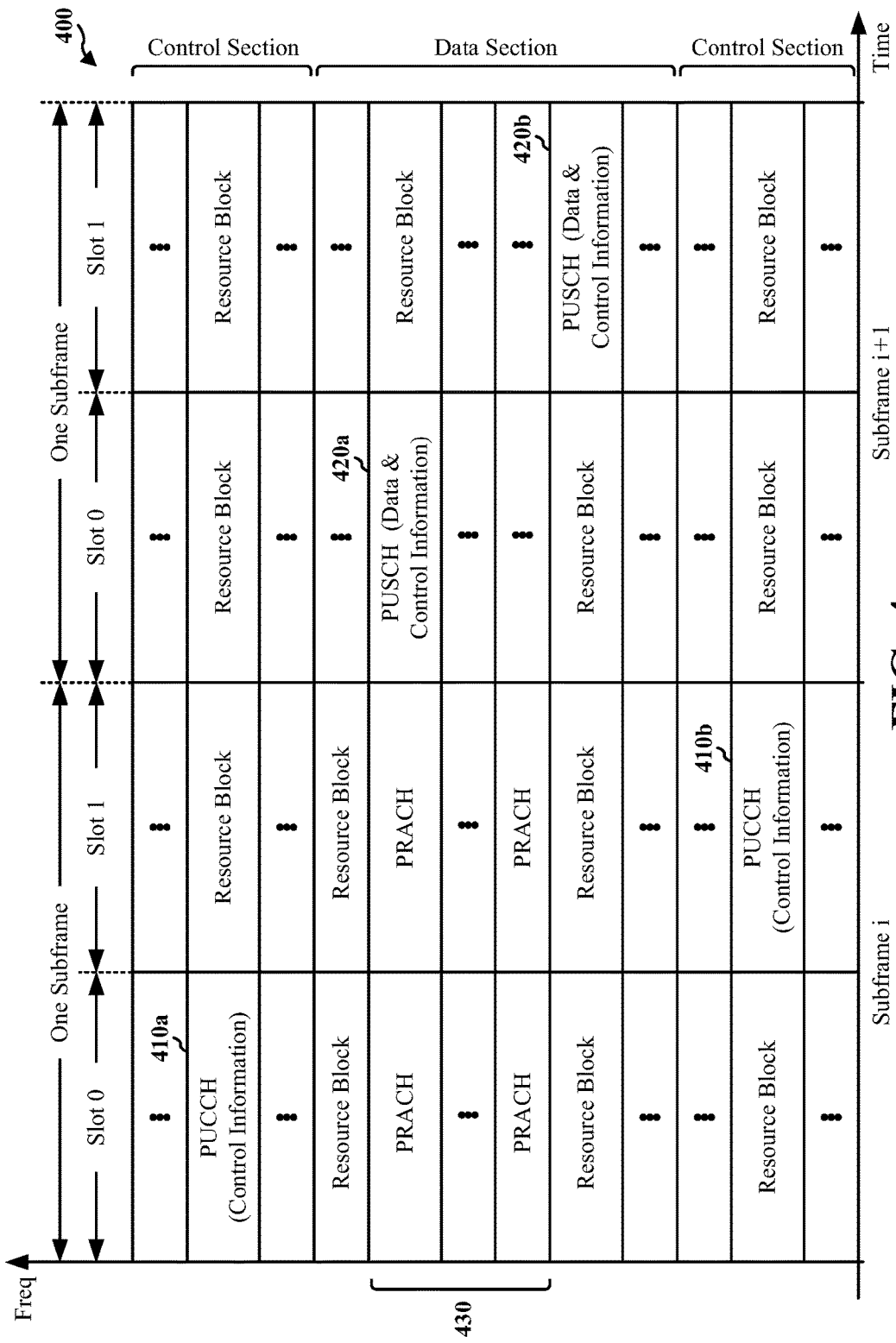
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
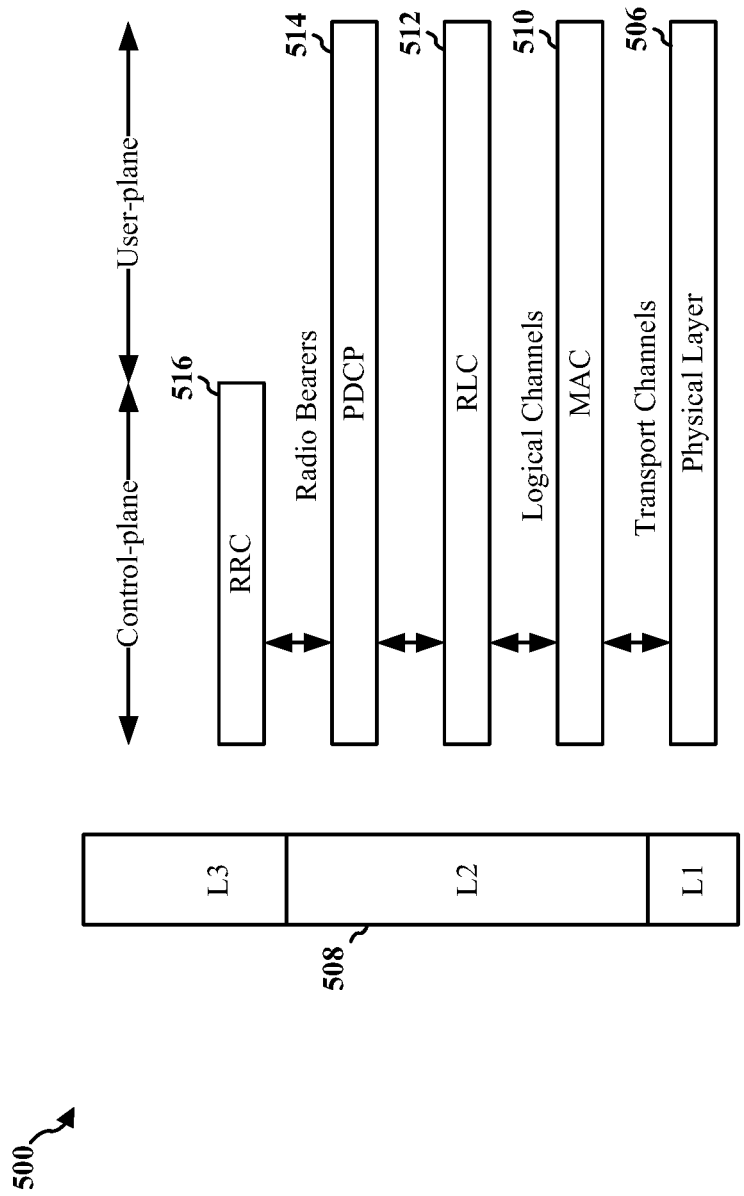
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
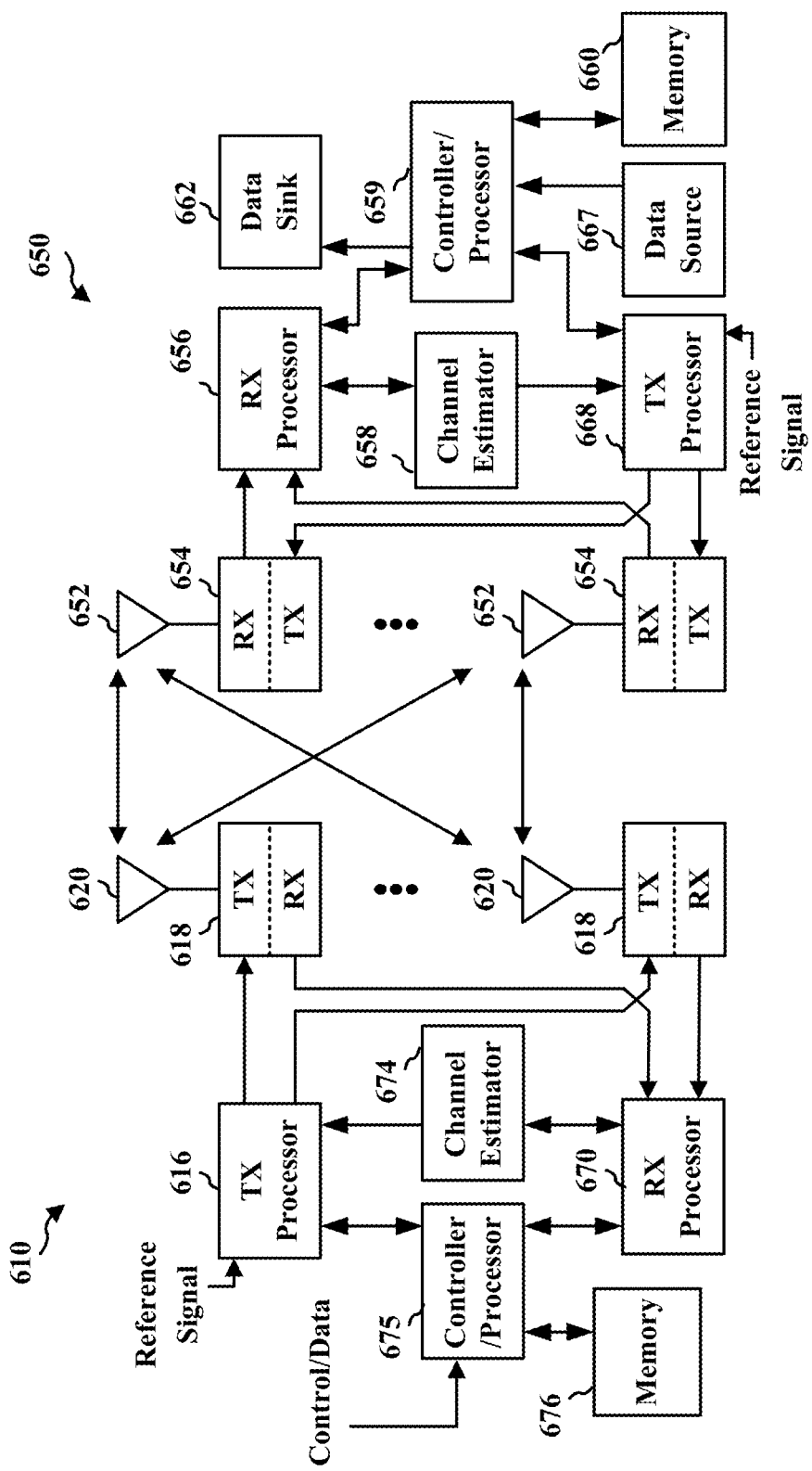
FIG. 6 is a diagram illustrating an example of an evolved Node B (eNB) and a user equipment (UE) in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
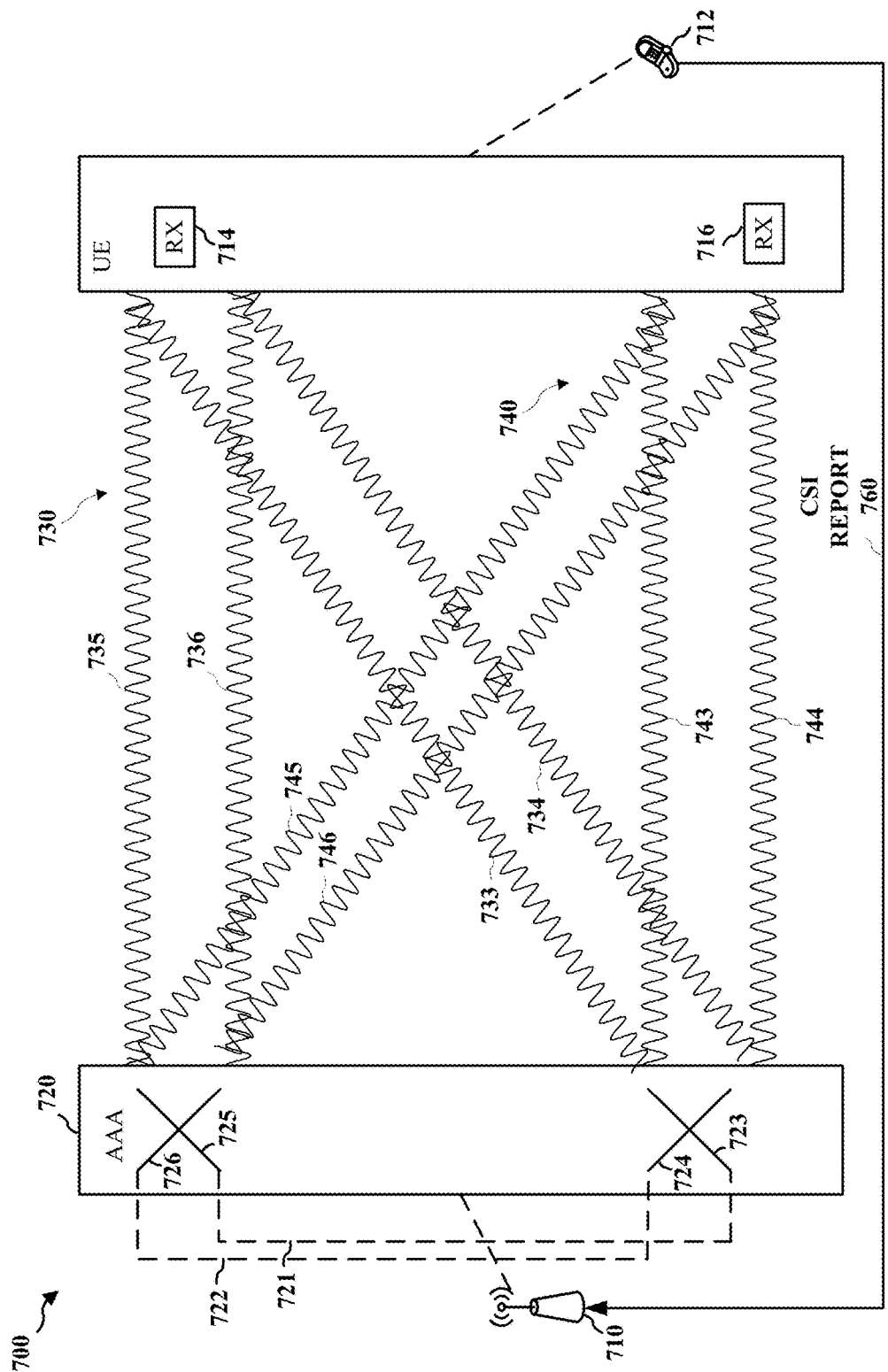
FIG. 7 is a diagram illustrating beamforming between an eNB and a UE.

FIG. 7 is a diagram 700 illustrating beamforming between an eNB and a UE. A UE 712 communicates with an eNB 710. The eNB 710 has a vertical antenna array 720. The vertical antenna array 720 may have multiple antenna columns and antenna rows. As an illustrative example and for clarify, FIG. 7 only shows a compact two-dimensional active-antenna array, i.e., a 4-transmitter cross-polarized vertical antenna array. The vertical antenna array 720 has a first antenna column 721 and a second antenna column 722. The first antenna column 721 has a first antenna 723 and a second antenna 725. The second antenna column 722 has a third antenna 724 and fourth antenna 726. In a first beamforming layer 730, the antennas 723, 724, 725, 726 transmit signal streams 733, 734, 735, 736 to the UE 712. In a second beamforming layer 740, the antennas 723, 724, 725, 726 transmit signal streams 743, 744, 745, 746 to the UE 712.

The UE 712 receives the streams 733, 735, 734, 736 of the first beamforming layer 730 at a receiver 714. The streams 733, 735, 734, 736 may interfere with each other. The UE 712 receives the streams 743, 745, 744, 746 of the second beamforming layer 740 at a receiver 716. Similarly, the streams 743, 745, 744, 746 may interfere with each other. The receiver 714 and the receiver 716 can measure the channel elements, e.g., channel state information reference signals (CSI-RS), of the streams 733, 735, 734, 736 and the streams 743, 745, 744, 746.

Based on the measured channel elements, the UE 712 may send CSI reports 760 to the eNB 710. A CSI report 760 may include a precoding type indicator (PTI), a rank indicator (RI), a channel quality indicator (CQI), and/or a PMI.

Based on the PMI carried in the CSI report 760, the eNB 710 can precode the signal streams to be transmitted by the vertical antenna array 720 and, thus, use beamforming techniques to improve signal power and to reduce interference among the streams 733, 735, 734, 736 and among the streams 743, 745, 744, 746. For example, the eNB 710 can precode the signals such that the streams 733, 735, 734, 736 interfere constructively, rather than destructively, with each other at the receiver 714 of the UE 712. Similarly, the eNB 710 can precode the signals such that the streams 743, 745, 744, 746 interfere constructively, rather than destructively, with each other at the receiver 716 of the UE 712.

The eNB 710 and the UE 712 each can have a copy of the same codebook. The cookbook has one or more codewords each indicating a precoding configuration. Based on the channel element measurements, the UE 712 can select one or more precoding configurations to be used at the eNB 710 for precoding signals to be transmitted to the UE 712. The UE 712 selects the one or more codewords from the codebook that correspond to the one or more precoding configurations. Each codeword can be indicated or represented by one or more bits in a unique bit combination. For example, a first codeword may be represented by "01," and a second codeword may be presented by "10." Indications (e.g., a bit combination or a value) of the selected codeword(s) can be included in the PMI and transmitted to the eNB 710. Upon receiving the PMI, the eNB 710 can extract the bit(s) representing the codeword(s) and, accordingly, select the corresponding codeword(s) from the codebook at the eNB 710. Subsequently, the eNB 710 can precode the signals to be transmitted to the UE 712 using the precoding configuration(s) indicated by the codewords(s).

In one configuration, the precoding configurations used by the eNB 710 may only address the interference at the azimuth dimension of the three-dimensional (3D) multipath propagation. For example, the precoding configurations may only attempt to reduce azimuth dimension interference such as the interference among the signal streams 733, 734, 735, 736 at the receiver 714. The codewords of the codebook used by the UE 712 and the eNB 710 accordingly only indicate such precoding configurations. The azimuth dimension, for example, is within the plane that is perpendicular to a long axis of the vertical antenna array 720, of the first antenna column 721, or of the second antenna column 722. Accordingly, the corresponding PMI used to indicate such a precoding configuration or codeword with respect to the azimuth dimension may be referred to as a PMI in the azimuth dimension (A-PMI). Further, an A-PMI may be a wideband A-PMI or a subband A-PMI.

In another configuration, the precoding configurations used by the eNB 710 may implement dynamic beam steering in a vertical dimension (or an elevation dimension). For example, the elevation dimension may be parallel to the long axis of the vertical antenna array 720, of the first antenna column 721, or of the second antenna column 722. Substantial capacity improvement and significant gain of interference avoidance can be achieved by exploiting the additional elevation dimension inherent in a MIMO wireless system. For example, the precoding configurations may reduce elevation dimension interference among the signal streams 733, 734, 735, 736 at the receiver 714. Accordingly, the corresponding PMI used to indicate such a precoding configuration or codeword with respect to the elevation dimension may be referred to as a PMI in the elevation dimension (E-PMI). Further, an E-PMI may be a wideband E-PMI or a subband E-PMI.

Figure 8:
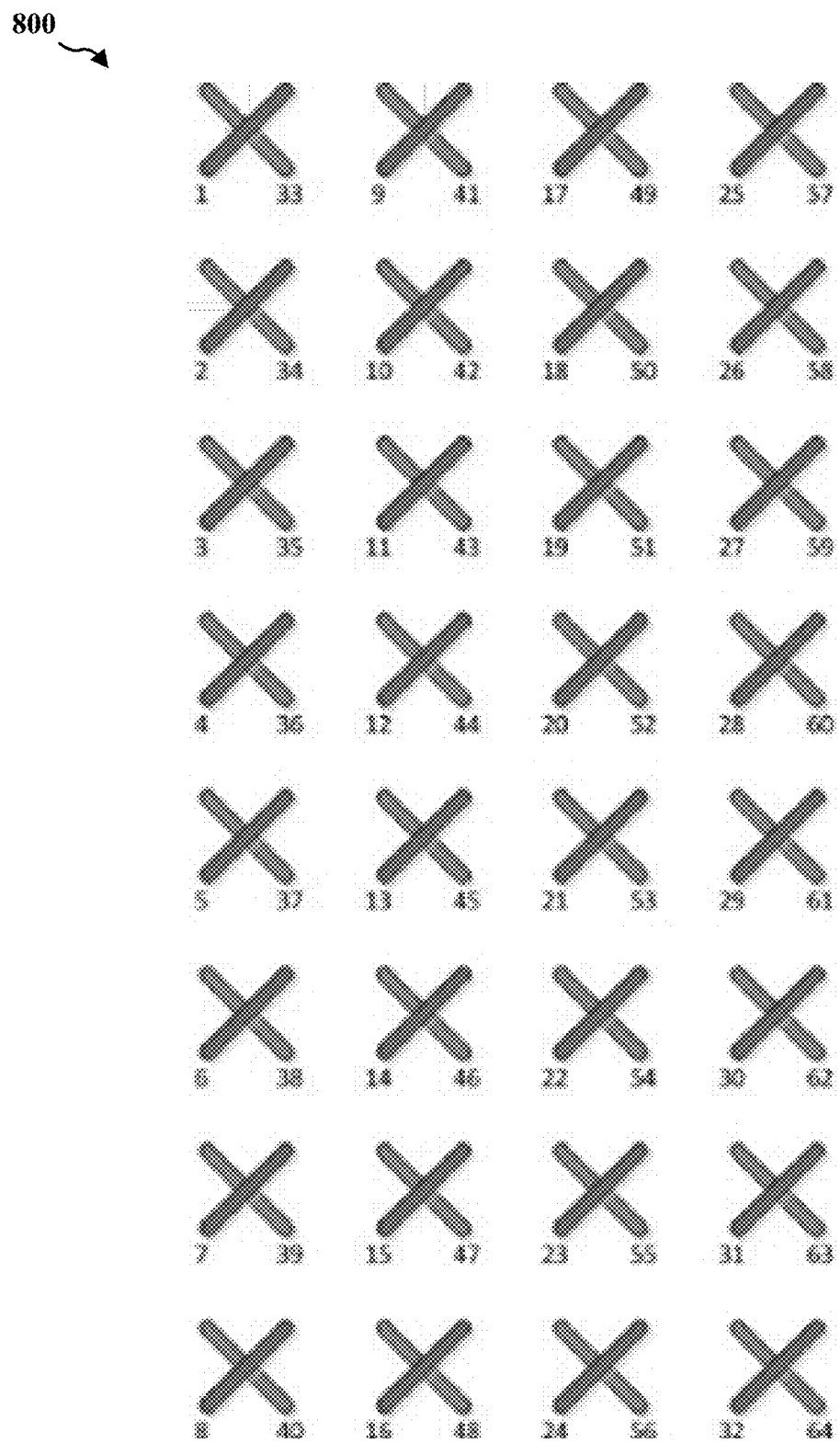
FIG. 8 is diagram illustrating a vertical antenna array.

FIG. 8 is diagram illustrating another vertical antenna array 800. The vertical antenna array 800 is an 8×8 two-dimensional, cross-polarized active-antenna array. The vertical antenna array 800 has 8 antenna columns and 8 antenna rows. The vertical antenna array 800 may be utilized by the eNB 710.

The UE 712 may transmit CSI reports 760 to the eNB 710 on a physical uplink control channel (PUCCH) periodically. The PUCCH can use several different formats such as formats 1, 1a, 1b, 2, 2a, 2b, and 3. The PUCCH is located at the edges of the uplink band using the resource blocks (RBs) reserved by the eNB 710. The UE 712 may transmit a PUCCH in two RBs, which may be in the first and second slots of a subframe and at opposite sides of the frequency band.

Figure 9:
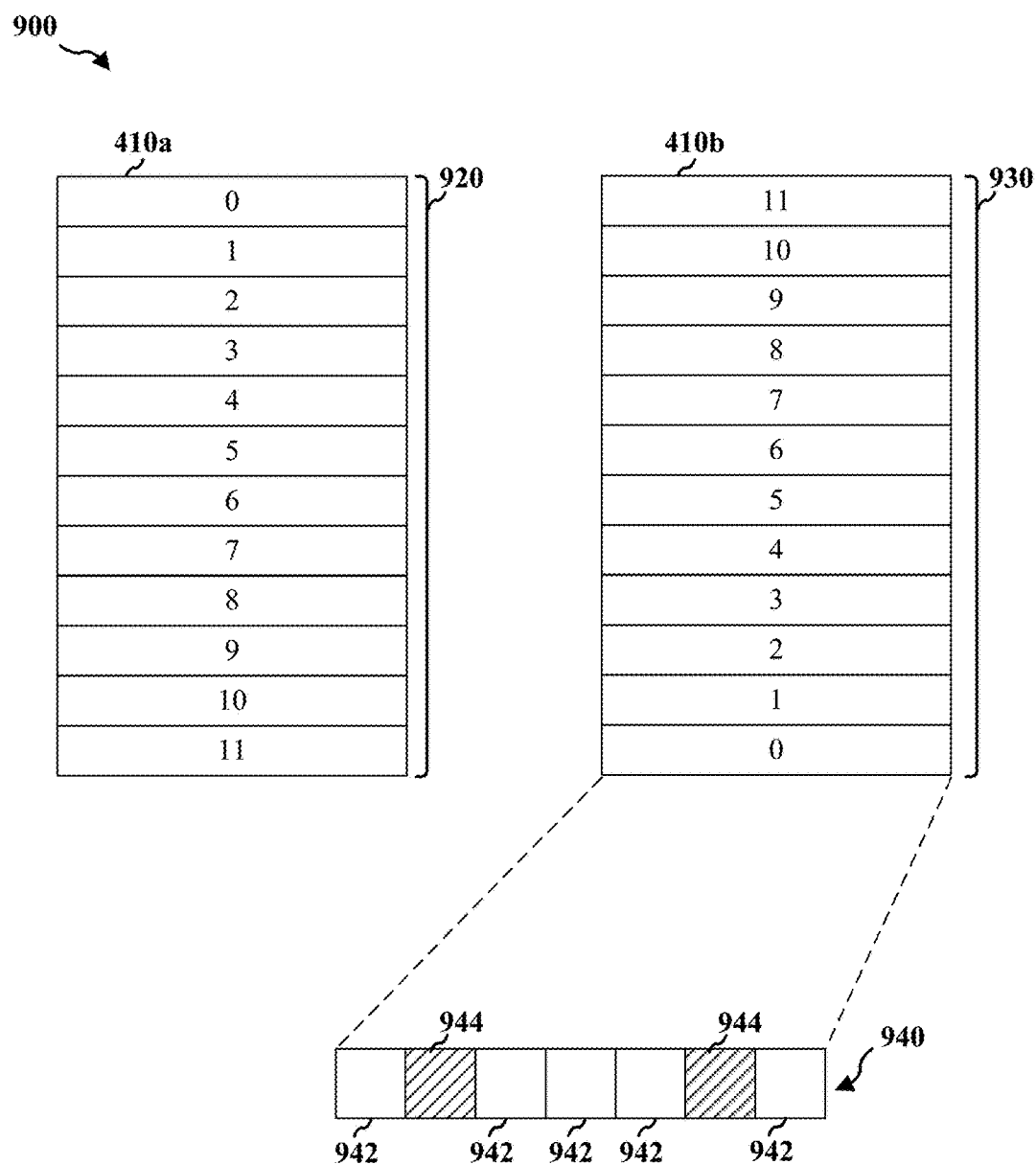
FIG. 9 is a diagram illustrating a PUCCH.

FIG. 9 is a diagram 900 illustrating a PUCCH. As an illustrative example, the UE 712 may transmit a PUCCH in the first RB 410a and the second RB 410b at opposite side of the uplink frequency band as shown in FIG. 4. In this example, the first RB 410a has 12 symbol sections 920 each on a subcarrier. The second RB 410b has 12 symbol sections 930 each on a subcarrier. Each symbol section 920, 930 can have a specific PUCCH format such as one of formats 1, 1a, 1b, 2, 2a, 2b, and 3. For example, the $0^{th}$ symbol section 930 of the second RB 410b is shown to be a symbol section of format 2/2a/2b 940. When using the normal cyclic prefix, a symbol section of format 2/2a/2b 940 has five PUCCH symbols 942 and two reference symbols 944.

In one configuration, the UE 712 transmits CSI reports in a PUCCH of format 2/2a/2b located in the RBs 410a, 410b. But the UE 712 does not have the RBs 410a, 410b to itself. In format 2/2a/2b, the eNB 710 configures 12 UEs to share the RBs 410a, 410b using a UE specific parameter known as the cyclic shift that runs from 0 to 11. Particularly, the eNB 710 may allocate to the UE 712 specific PUCCH resource that includes one symbol section 920 and one symbol section 930. For example, the UE 712 may be allocated the $0^{th}$ PUCCH resource that includes the 0th symbol section 920 and the $0^{th}$ symbol section 930.

As discussed supra, the size of the payload of a standard type CSI reports under "3GPP TS 36.213 V12.2.0 (2014-06); 3rd Generation Partnership Project; Technical Specification Group Radio Access Network; Evolved Universal Terrestrial Radio Access (E-UTRA); Physical layer procedures (Release 12)" (3GPP TS 36.213 V12.2.0 (2014-06)) do not exceed 11 information bits. The CSI information bits may be encoded (e.g., using Reed-Muller code) into 20 coded bits. The coded bits may be then mapped into 10

QPSK modulation symbols, and subsequently each modulation symbol may be spread using a length-12 orthogonal sequence using the pre-configured cyclic shift.

Under Release 12, the following CQI/PMI and RI reporting types with distinct periods and offsets are supported:

Type 1 report supports CQI feedback for the UE selected sub-bands.
Type 1a report supports subband CQI and second PMI feedback.
Type 2, Type 2b, and Type 2c report support wideband CQI and PMI feedback.
Type 2a report supports wideband PMI feedback.
Type 3 report supports RI feedback.
Type 4 report supports wideband CQI Type 5 report supports RI and wideband PMI feedback.
Type 6 report supports RI and PTI feedback.

Table 1 shows the payload size per PUCCH reporting mode and mode state defined by Release 12:

TABLE 1

| PUCCH Reporting Type | Reported | Mode State | Mode 1-1 (bits/BP*) | Mode 2-1 (bits/BP*) | Mode 1-0 (bits/BP*) | Mode 2-0 (bits/BP*) |
|---|---|---|---|---|---|---|
| 1 | Sub-band CQI | RI = 1 | NA | 4 + L | NA | 4 + L |
|  |  | RI > 1 | NA | 7 + L | NA | 4 + L |
| 1a | Sub-band CQI/ second PMI | 8 antenna ports RI = 1 | NA | 8 + L | NA | NA |
|  |  | 8 antenna ports 1 < RI < 5 | NA | 9 + L | NA | NA |
|  |  | 8 antenna ports RI > 4 | NA | 7 + L | NA | NA |
|  |  | 4 antenna ports RI = 1 | NA | 8 + L | NA | NA |
|  |  | 4 antenna ports 1 < RI ≤ 4 | NA | 9 + L | NA | NA |
| 2 | Wideband CQI/PMI | 2 antenna ports RI = 1 | 6 | 6 | NA | NA |
|  |  | 4 antenna ports RI = 1 | 8 | 8 | NA | NA |
|  |  | 2 antenna ports RI > 1 | 8 | 8 | NA | NA |
|  |  | 4 antenna ports RI > 1 | 11 | 11 | NA | NA |
| 2a | Wideband first PMI | 8 antenna ports RI < 3 | NA | 4 | NA | NA |
|  |  | 8 antenna ports 2 < RI < 8 | NA | 2 | NA | NA |
|  |  | 8 antenna ports RI = 8 | NA | 0 | NA | NA |
|  |  | 4 antenna ports 1 ≤ RI ≤ 2 | NA | 4 | NA | NA |
|  |  | 4 antenna ports 2 ≤ RI ≤ 4 | NA | NA | NA | NA |
| 2b | Wideband CQI/ second PMI | 8 antenna ports RI = 1 | 8 | 8 | NA | NA |
|  |  | 8 antenna ports 1 < RI < 4 | 11 | 11 | NA | NA |
|  |  | 8 antenna ports RI = 4 | 10 | 10 | NA | NA |
|  |  | 8 antenna ports RI > 4 | 7 | 7 | NA | NA |
|  |  | 4 antenna ports RI = 1 | 8 | 8 | NA | NA |
|  |  | 4 antenna port 1 < RI ≤ 4 | 11 | 11 | NA | NA |
| 2c | Wideband CQI/ first PMI/ second PMI | 8 antenna ports RI = 1 | 8 | NA | NA | NA |
|  |  | 8 antenna ports 1 < RI ≤ 4 | 11 | NA | NA | NA |
|  |  | 8 antenna ports 4 < RI ≤ 7 | 9 | NA | NA | NA |
|  |  | 8 antenna ports RI = 8 | 7 | NA | NA | NA |
|  |  | 4 antenna ports RI = 1 | 8 | NA | NA | NA |
|  |  | 4 antenna port 1 < RI ≤ 4 | 11 | NA | NA | NA |
| 3 | RI | 2/4 antenna ports, 2-layer spatial multiplexing | 1 | 1 | 1 | 1 |
|  |  | 8 antenna ports, 2-layer spatial multiplexing | 1 | NA | NA | NA |
|  |  | 4 antenna ports, 4-layer spatial multiplexing | 2 | 2 | 2 | 2 |
|  |  | 8 antenna ports, 4-layer spatial multiplexing | 2 | NA | NA | NA |
|  |  | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
|  |  | 8 antenna ports, 4 and 8-layer spatial multiplexing | 5 |  |  |  |
|  |  | 4 antenna ports, 2-layer spatial multiplexing | 4 |  |  |  |
|  |  | 4 antenna ports, 4-layer spatial multiplexing | 5 |  |  |  |
| 6 | RI/PTI | 8 antenna ports, 2-layer spatial multiplexing | NA | 2 | NA | NA |
|  |  | 8 antenna ports, 4-layer spatial multiplexing | NA | 3 | NA | NA |
|  |  | 8 antenna ports, 8-layer spatial multiplexing | NA | 4 | NA | NA |
|  |  | 4 antenna ports, 2-layer spatial multiplexing | NA | 2 | NA | NA |
|  |  | 4 antenna ports, 4-layer spatial multiplexing | NA | 3 | NA | NA |

NOTE:
*For wideband CQI reporting types, the stated payload size applies to the full bandwidth. L bits are for signaling the subband index within the subband part. For 20 MHz, L is 2

Configuration 1

In a first configuration, the UE 712 may use a PUCCH resource such as the 0th symbol section 920 and the $0^{th}$ symbol section 930 to transmit a modified CSI report to the eNB 710. In addition to the RI, CQI, and A-PMI, the modified CSI report also includes an E-PMI. The E-PMI may add two or more additional information bits to the modified CSI report. As discussed supra, The RI, CQI, and/or A-PMI may use up to 11 information bits. In certain circumstances, a modified CSI report including an E-PMI may still use 11 or information bits.

In certain circumstances, a modified CSI report including an E-PMI may use 13 information bits. If using the same CSI encoding technique under Release 12 (which encodes 11 information bits to 20 coded bits), the modified CSI report may use more than 20 coded bits. The UE 712 is allocated of the $0^{th}$ symbol section 920 and the $0^{th}$ symbol section 930 of format 2/2a/2b, which have only 20 coded bits available, to transmit the modified CSI report. Thus, additional techniques are needed in order to transmit the modified CSI report using the $0^{th}$ symbol sections 920, 930.

Accordingly, the eNB 710 may instruct the UE 712 to use an encoding algorithm to encode 13 information bits into 20 coded bits. The A-PMI and the E-PMI may be jointly encoded. Each time the UE 712 needs to send a standard type CSI reports to transmit A-PMIs, the UE 712 may modify the standard type CSI reports to additionally include corresponding E-PMIs. The eNB 710 can transmit the instructions or configurations to the UE 712 through master information blocks (MIBs) or system information blocks (SIBs). The existing report types (e.g., 1a, 2a, 2b, and 2c) can be modified to carry both A-PMI and E-PMI.

For example, when 1<RI<4, a type 2b CSI report may use 4 bits for wideband CQI and 3 bits spatial differential CQI. A modified type 2b CSI report may use the same number of information bits as defined in Release 12 to carry the wideband CQI (i.e., 4 bits) and the spatial differential CQI (i.e., 3 bits). As discussed, the payload of the modified type 2b CSI report can have 13 information bits. Thus, the modified type 2b CSI report may have 6 information bits available for A-PMI and E-PMI. However, the A-PMI may use 4 information bits. The E-PMI may use 4 or more information bits. In other words, the A-PMI and the E-PMI together may use more than 6 information bits. In this situation, in one technique, the UE 712 can down sample the A-PMI and the E-PMI such that the A-PMI and the E-PMI together do not use more than 6 information bits. By doing so, the modified type 2b CSI report may include both the A-PMI and the E-PMI. In another technique, the E-PMI only uses the remaining information bits of the available information bits that are not used by the A-PMI. For example, if there are 6 information bits available for the A-PMI and the E-PMI in the modified CSI report and the A-PMI uses 4 information bits, then the E-PMI uses the remaining 2 information bits.

Configuration 2

In a second configuration, the UE 712 may construct new CSI reports to carry the E-PMIs. For example, the UE 712 and the eNB 710 are configured to implement a next generation type 1b CSI report and a next generation type 2d CSI report. The next generation type 1b CSI report can carry a subband CQI and a subband E-PMI. The next generation type 2d CSI report can carry a wideband CQI and a wideband E-PMI. The UE 712 may use the same encoding techniques as defined in Release 12 to encode the next generation type 1b CSI report and the next generation type 2d CSI report. That is, 11 information bits may be encoded into 20 coded bits.

More specifically, for RI=1, the next generation type 1b CSI report may use 4 bits for a subband CQI, 4 bits for a subband E-PMI, and L bits for a subband selection. For RI>1, the type 1b report may use 4 bits for a subband CQI, 3 bits for a spatial differential CQI, 2 bits for a subband E-PMI, and L bits for a subband selection.

For RI=1, the type 2d report may use 4 bits for a wideband CQI and 4 bits for a wideband E-PMI. For RI>1, the type 2d report may use 4 bits for a wideband CQI, 3 bits for a spatial differential CQI, and 4 bits for a wideband E-PMI.

The eNB 710 may configure the UE 712 to report the standard type 1a CSI report and the next generation type 1b CSI report alternately on the same periodicity but on different subframe offset. The eNB 710 can also configure the UE 712 to report the standard type 2b CSI report and the next generation type 2d CSI report alternately on the same periodicity but on different subframe offset. The UE 712 may receive a configuration from the eNB 710. The configuration specifies transmission parameters for transmitting the standard type CSI reports and the modified CSI reports. The parameters indicate at least one of the reporting periodicity and a subframe offset of the standard type CSI reports and the modified CSI reports.

For example, under Release 12 without reporting E-PMI, the eNB 710 may configure the UE 712 to report a standard type 2b CSI report on every subframe 1 and every subframe 6. Using the technique described here, the eNB 710 may configure the UE 712 to report a standard type 2b CSI report on every subframe 1 and a next generation type 2d CSI report on every subframe 6. In other words, the UE 712 may replace a standard type 2b CSI report transmitted on subframe 6 with a next generation type 2d CSI report.

Figure 10:
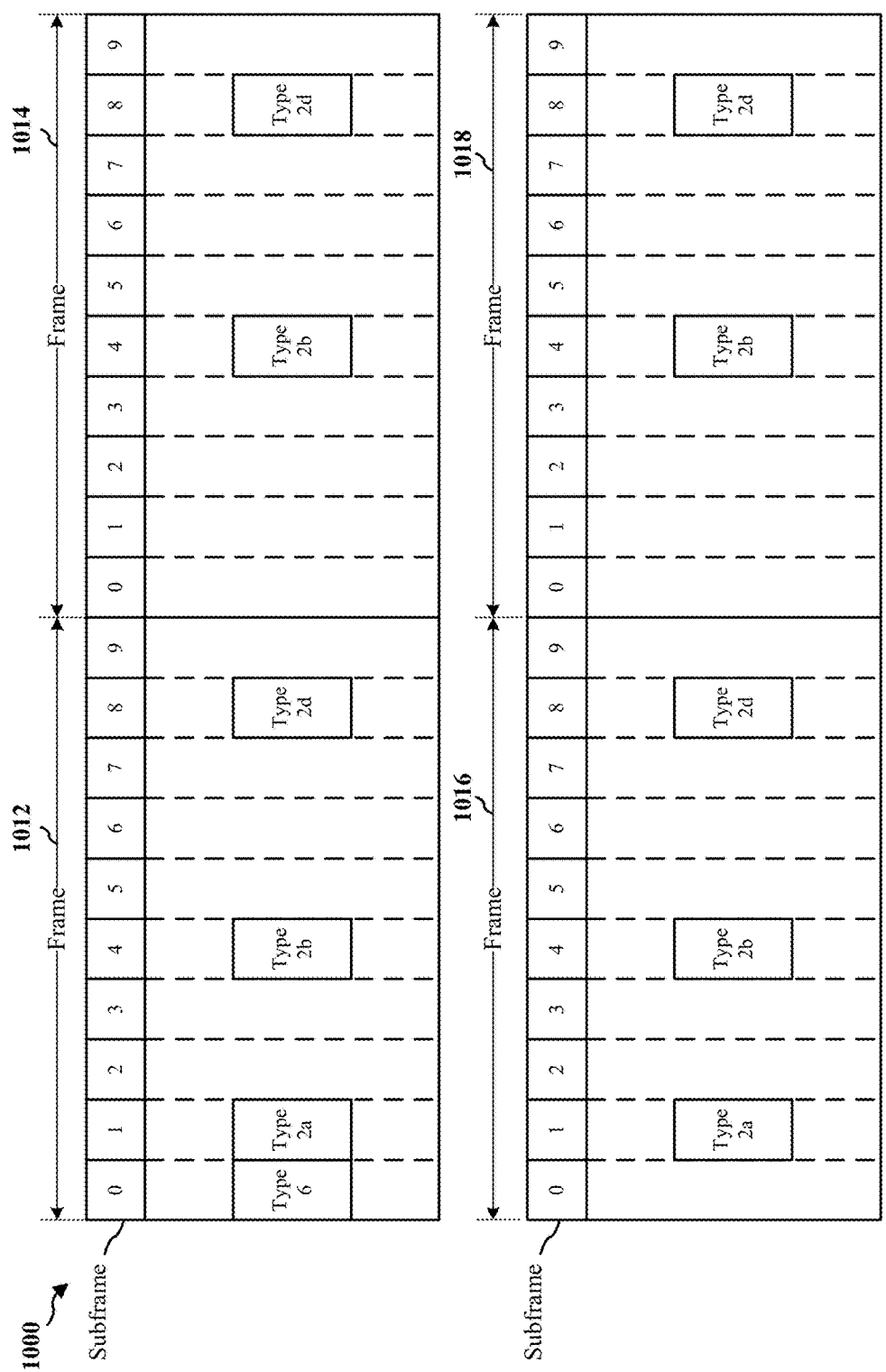
FIG. 10 is a diagram illustrating a CSI reporting technique between a UE and an eNB.

FIG. 10 is a diagram 1000 illustrating a CSI reporting technique between the UE 712 and the eNB 710. In this example, the PTI is 0. Accordingly, the eNB 710 may configure the UE 712 to transmit standard type 6 CSI reports, standard type 2a CSI reports, standard type 2b CSI reports, and next generation type 2d CSI reports to the eNB 710. Further, in this example, the eNB 710 configures the UE 712 to transmit one standard type 6 CSI report, two standard type 2a CSI reports, four standard type 2b CSI reports, and four next generation type 2d CSI reports every four frames (i.e., frames 1012, 1014, 1016, 1018). Each frame has subframes 0-9 (i.e., 10 subframes). More specifically, the UE 712 transmits a standard type 6 CSI report on the subframe 0 of the frame 1012. The UE 712 transmits a standard type 2a CSI report on the subframe 1 of the frame 1012 and the frame 1016. The UE 712 transmits a standard type 2b CSI report on the subframe 4 of each of the frames 1012, 1014, 1016, 1018. The UE 712 transmits a next generation type 2d CSI report on the subframe 8 of each of the frames 1012, 1014, 1016, 1018.

The standard type 6 CSI report may use 3 bits for an RI and 1 bit for a PTI. In this example, the PTI is 0.

The standard type 2a CSI report may report a first wideband A-PMI. Particularly, if RI=1 or 2, the standard type 2a CSI report may use 4 bits for the first wideband A-PMI. If 2<RI<8, the standard type 2a CSI report may use 2 bits for the first wideband A-PMI. If RI=8, the standard type 2a CSI report may use 0 bit for the first wideband A-PMI.

The standard type 2b CSI report may report a wideband CQI and a second wideband A-PMI. Particularly, if RI=1, the standard type 2b CSI report may use 4 bits for the wideband CQI and 4 bits for the second wideband A-PMI. If 1<RI<4, the standard type 2b CSI report may use 4 bits for the wideband CQI, 3 bits for a spatial differential CQI, and 4 bits for the second wideband A-PMI. If RI=4, the standard type 2b CSI report may use 4 bits for the wideband CQI, 3 bits for the spatial differential CQI, and 3 bits for the second wideband A-PMI. If RI>4, the standard type 2b CSI report may use 4 bits for the wideband CQI, 3 bits for the spatial differential CQI, and 0 bit for the second wideband A-PMI.

The next generation type 2d CSI report may report a wideband CQI and a wideband E-PMI. Particularly, if RI=1, the next generation type 2d CSI report may use 4 bits for the wideband CQI and 4 bits for the wideband E-PMI. If RI>1, the next generation type 2d CSI report may use 4 bits for the wideband CQI, 3 bits for a spatial differential CQI, and 4 bits for the wideband E-PMI.

Figure 11:
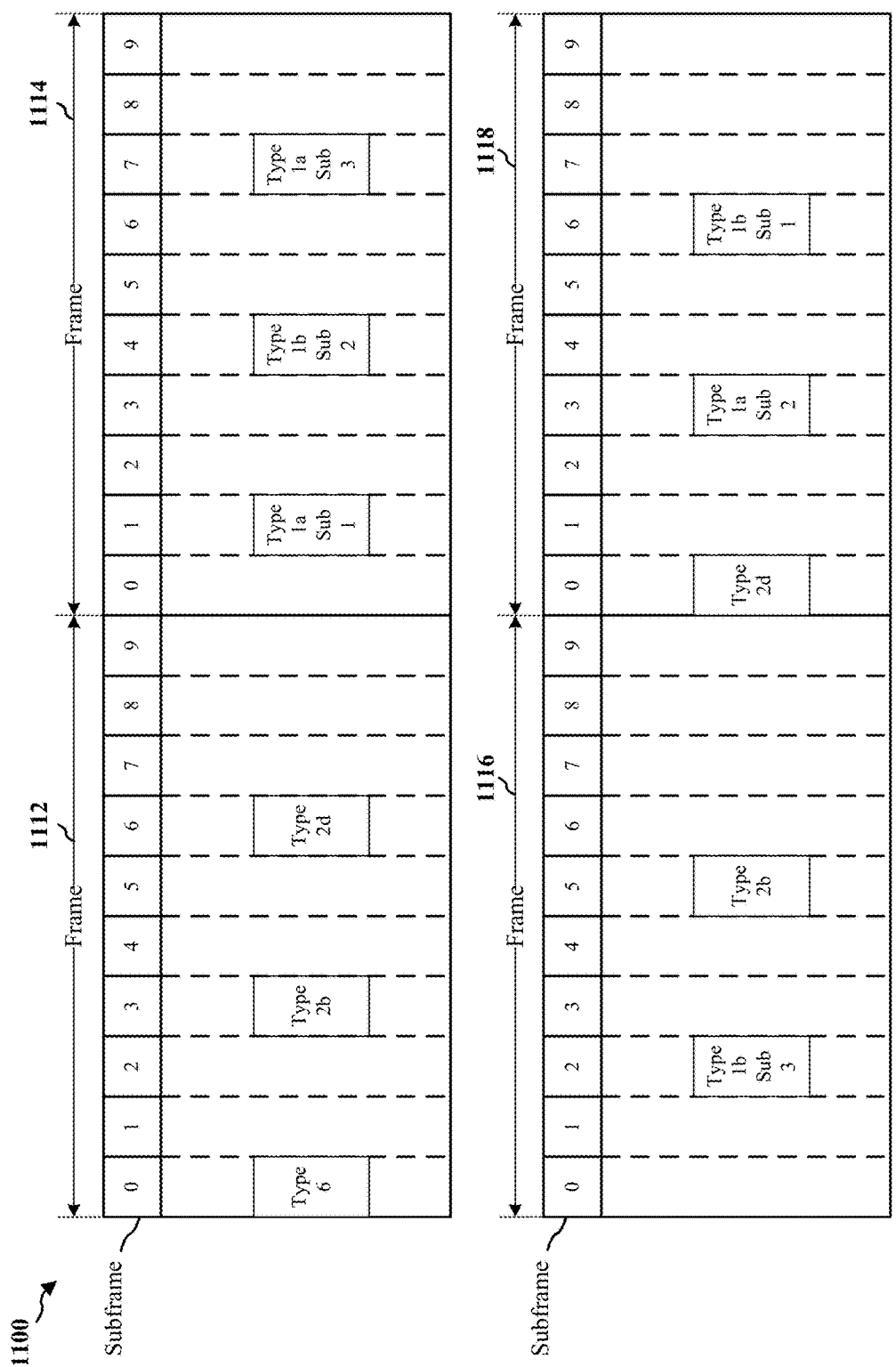
FIG. 11 is a diagram illustrating another CSI reporting technique between a UE and an eNB.

FIG. 11 is a diagram illustrating another first CSI reporting technique between the UE 712 and the eNB 710. In this example, the PTI is 1. Accordingly, the eNB 710 may configure the UE 712 to transmit standard type 6 CSI reports, standard type 1a CSI reports, next generation type 1b CSI reports, standard type 2b CSI reports, and next generation type 2d CSI reports to the eNB 710. Further, in this example, the eNB 710 configures the UE 712 to transmit one standard type 6 CSI report, three standard type 1a CSI reports, three next generation type 1b CSI reports, two standard type 2b CSI reports, and two next generation type 2d CSI reports every four frames (i.e., frames 1112, 1114, 1116, 1118). Each frame has subframes 0-9 (i.e., 10 subframes). More specifically, the UE 712 transmits a standard type 6 CSI report on the subframe 0 of the frame 1112. The UE 712 transmits a standard type 2b CSI report on the subframe 3 of the frame 1112 and the subframe 5 of the frame 1116. The UE 712 transmits a next generation type 2d CSI report on the subframe 6 of the frame 1112 and the subframe 0 of the frame 1118. The UE 712 transmits standard type 1a CSI report on the subframe 1 of the frame 1114, the subframe 7 of the frame 1114, and the subframe 3 of the frame 1118 for the subband 1, the subband 3, and the subband 2, respectively. The UE 712 transmits next generation type 1b CSI report on the subframe 4 of the frame 1114, the subframe 2 of the frame 1116, and the subframe 6 of the frame 1118 for the subband 2, the subband 3, and the subband 1, respectively.

The standard type 6 CSI report may use 3 bits for an RI and 1 bit for a PTI. In this example, the PTI is 1.

The standard type 2b CSI report may report a wideband CQI and a wideband A-PMI. Particularly, if RI=1, the standard type 2b CSI report may use 4 bits for the wideband CQI and 4 bits for the wideband A-PMI. If 1<RI<4, the standard type 2b CSI report may use 4 bits for the wideband CQI, 3 bits for a spatial differential CQI, and 4 bits for the wideband A-PMI. If RI=4, the standard type 2b CSI report may use 4 bits for the wideband CQI, 3 bits for the spatial differential CQI, and 3 bits for the wideband A-PMI. If RI>4, the standard type 2b CSI report may use 4 bits for the wideband CQI, 3 bits for the spatial differential CQI, and 0 bit for wideband A-PMI.

The next generation type 2d CSI report may report a wideband CQI and a wideband E-PMI. Particularly, if RI=1, the next generation type 2d CSI report may use 4 bits for the wideband CQI and 4 bits for the wideband E-PMI. If RI>1, the next generation type 2d CSI report may use 4 bits for the wideband CQI, 3 bits for a spatial differential CQI, and 4 bits for the wideband E-PMI.

The standard type 1a CSI report may report a subband CQI and a subband A-PMI. Particularly, if RI=1, the standard type 1a CSI report may use 4 bits for the subband CQI, 4 bits for the subband A-PMI, and L bits for a subband selection. If 1<RI<5, the standard type 1a CSI report may use 4 bits for the subband CQI, 3 bits for a spatial differential CQI, 2 bits for the subband A-PMI, and L bits for a subband selection. If RI>4, the standard type 1a CSI report may use 4 bits for the subband CQI, 3 bits for the spatial differential CQI, 0 bit for the subband A-PMI, and L bits for subband selection.

The next generation type 1b CSI report may report a subband CQI and a subband E-PMI. Particularly, if RI=1, the next generation type 1b CSI report may use 4 bits for the subband CQI, 4 bits for the subband E-PMI, and L bits for a subband selection. If RI>1, the next generation type 1b CSI report may use 4 bits for the subband CQI, 3 bits for a spatial differential CQI, 2 bits for the subband E-PMI, and L bits for the subband selection.

Further, the UE 712 may be configured to determine a CQI reported in each CSI report based on the PMI in the same report as well as the PMI(s) transmitted in the previous report(s).

For standard type 2b CSI reports and next generation type 2d CSI reports, the reported wideband CQI may be determined based on the previous reported wideband E-PMI or wideband A-PMI as well as the wideband A-PMI or wideband E-PMI currently transmitted. Using the example shown in FIG. 10, the UE 712 determines the wideband CQI carried in the next generation type 2d CSI report transmitted on the subframe 8 of the frame 1012 based on the wideband E-PMI carried in the same report and the wideband A-PMI carried in the standard type 2b CSI report transmitted on the subframe 4 of the frame 1012. The UE 712 determines the wideband CQI carried in the standard type 2b CSI report transmitted on the subframe 4 of the frame 1016 based on the wideband A-PMI carried in the same report and the wideband E-PMI carried in the next generation type 2d CSI report transmitted on the subframe 8 of the frame 1014.

For standard type 1a CSI reports and next generation type 1b CSI reports, in one technique, the subband CQI carried in a standard type 1a CSI report may be calculated based on the subband A-PMI carried in the same report and a wideband E-PMI carried in a previously transmitted next generation type 2d CSI report. The subband CQI carried in a next generation type 1b CSI report may be calculated based on the subband E-PMI carried in the same report and a wideband A-PMI carried in a previously transmitted standard type 2b CSI report. Using the example shown in FIG. 7, the UE 712 determines the subband CQI carried in the standard type 1a CSI report transmitted on the subframe 1 of the frame 1114 based on the subband A-PMI carried in the same report and the wideband E-PMI carried in the next generation type 2d CSI report transmitted on the subframe 6 of the frame 1112. The UE 712 determines the subband CQI carried in the next generation type 1b CSI report transmitted on the subframe 4 of the frame 1114 based on the subband E-PMI carried in the same report and the wideband A-PMI carried in the standard type 2b CSI report transmitted on the subframe 3 of the frame 1112.

For standard type 1a CSI reports and next generation type 1b CSI reports, in another technique, the subband CQI carried in a standard type 1a CSI report may be calculated based on the subband A-PMI carried in the same report and a subband E-PMI carried in a previously transmitted next generation type 1b CSI report with respect to the same subband. The subband CQI carried in a next generation type 1b CSI report may be calculated based on the subband E-PMI carried in the same report and a subband A-PMI carried in a previously transmitted standard type 1a CSI report with respect to the same subband. Using the example shown in FIG. 7, the UE 712 determines the subband CQI carried in the standard type 1a CSI report with respect to the subband 2 transmitted on the subframe 3 of the frame 1118 based on the subband A-PMI carried in the same report and the subband E-PMI carried in the next generation type 1b CSI report with respect to the subband 2 transmitted on the subframe 4 of the frame 1114. The UE 712 determines the subband CQI carried in the next generation type 1b CSI report with respect to the subband 1 transmitted on the subframe 6 of the frame 1118 based on the subband E-PMI carried in the same report and the subband A-PMI carried in the standard type 1a CSI report with respect to the subband 1 transmitted on the subframe 1 of the frame 1114.

Configuration 3

In a third configuration, the eNB 710 may instruct the UE 712 to only report a wideband E-PMI. In one technique, the wideband E-PMI may be included in a modified type 2a CSI report or, when RI=1, a modified type 2b/2c CSI report. As described supra with respect to FIG. 10, a standard type 2a CSI report may report a first wideband A-PMI and may use up to 4 information bits. On the other hand, the payload of a standard type 2a CSI report may be configured to carry 11 information bits. In other words, the UE 712 may use the remaining information bits of the modified type 2a CSI report to carry the wideband E-PMI. The UE 712 may modify a standard type 2a CSI report to generate a modified type 2a CSI report, which includes both the wideband A-PMI and the wideband E-PMI in the report. The UE 712 may use the same encoding techniques as defined in Release 12 to encode the modified type 2a CSI report. That is, 11 information bits may be encoded into 20 coded bits.

Further, when RI=1, a standard type 2b, 2c CSI report may use up to 8 information bits to carry wideband CQI and wideband A-PMI(s). Thus, the UE 712 may use the remaining information bits (e.g., 3 information bits) of the standard type 2b, 2c CSI report to carry the wideband E-PMI. In other words, the UE 712 may modify a standard type 2b/2c CSI report to generate a modified type 2b/2c CSI report, which includes both the wideband A-PMI(s) and the wideband E-PMI in the report. The UE 712 may use the same encoding techniques as defined in Release 12 to encode the modified type 2b/2c CSI report. That is, 11 information bits may be encoded into 20 coded bits.

In another technique, when RI>1, the wideband E-PMI may be included in a modified type 2b/2c CSI report. The UE 712 may modify a spatial differential CQI in a standard type 2b/2c CSI report to generate a modified type 2b/2c CSI report. For example, a spatial differential CQI in a standard type 2b/2c CSI report may use 3 information bits. The eNB 710 and the UE 712 can use the information bits allocated to the spatial differential CQI in a standard type 2b/2c CSI report to carry a spatial differential CQI and a wideband E-PMI alternately. The UE 712 may use an E-PMI indicator (EPI) to indicate whether the information bits allocated to the spatial differential CQI are used to carry a spatial differential CQI or a wideband E-PMI. For example, the EPI may be one bit, e.g., the most significant bit, of the 3 information bits and may indicate whether the remaining bits carry a spatial differential CQI or a wideband E-PMI. Further, the UE 712 may need to down sample the spatial differential CQI or the wideband E-PMI to 2 information bits. For example, the UE 712 may use 0 at the most significant bit to indicate that the remaining two bits are a spatial differential CQI and may use 1 to indicate that the remaining two bits are a wideband E-PMI. Thus, the UE 712 may generate a modified type 2b/2c CSI report in which the remaining two bits of the 3 information bits carry a spatial differential CQI or a wideband E-PMI according to needs. Particularly, the UE 712 may, alternately, generate, and transmit to the eNB 710, a modified type 2b/2c CSI report carrying a spatial differential CQI and a modified type 2b/2c CSI report carrying a wideband E-PMI.

Configuration 4

In a fourth configuration, the UE 712 may utilize PUCCH resources to transmit a wideband E-PMI to the eNB 710. Referring back to FIG. 9, the first RB 410a and the second RB 410b include 12 PUCCH resources. Each PUCCH resource (e.g., the $0^{th}$ PUCCH resource, the $1^{st}$ PUCCH resource, . . . , or the $11^{th}$ PUCCH resource) includes a symbol section 920 of the first RB 410a and a symbol section 930 of the second RB 410b (e.g., the $0^{th}$ symbol sections 920, 930; the $1^{st}$ symbol sections 920, 930; . . . , or the $11^{th}$ symbol sections 920, 930). The UE 712 may down sample the wideband E-PMI to 2 bits. The eNB 710 and the UE 712 may assign wideband E-PMI values to one or more of the PUCCH resources in the RBs 410a, 410b. When the UE 712 has determined a wideband E-PMI, the UE 712 then uses a PUCCH resource corresponding to the determined wideband E-PMI to transmit any other standard type CSI reports.

For example, the $0^{th}$ PUCCH resource may correspond to a value "00." The $3^{rd}$ PUCCH resource may correspond to a value "01." The $6^{th}$ PUCCH resource may correspond to a value "10." The $9^{th}$ PUCCH resource may correspond to a value "11." Suppose that the UE 712 have determined that the wideband E-PMI value is "10" and, at the time, may need to transmit a standard type 2a CSI report to the eNB 710. Accordingly, the eNB 710 selects the $6^{th}$ PUCCH resource, which corresponds to the wideband E-PMI value "10," to transmit the standard type 2a CSI report. Subsequently, the eNB 710 receives the standard type 2a CSI report on the 6th PUCCH resource. Based on the selected PUCCH resource, the eNB 710 can determine that the wideband E-PMI at the UE 712 is "10."

Configuration 5

In a fifth configuration, the UE 712 may use a PUCCH of format 3 to transmit modified CSI reports that include, in addition to the A-PMIs, the E-PMIs. The A-PMI and the E-PMI may be jointly encoded. Each time the UE 712 needs to send a standard type CSI reports to transmit an A-PMI, the UE 712 may modify the standard type CSI reports to additionally include a corresponding E-PMI. The PUCCH of format 3 may carry up to 22 information bits. The eNB 710 and the UE 712 may be configured to use the PUCCH of format 3 to transmit a set of multiple hybrid automatic repeat-request (HARQ) acknowledgement bits. In one example, when the UE 712 does not need to transmit the HARQ acknowledgement bits, the UE 712 can use the PUCCH of format 3 to transmit modified CSI reports, which include both an A-PMI and the E-PMI and whose payload may be more than 11 information bits. In another example, PUCCH format 3 is used when a CSI report is greater than 11 bits; otherwise PUCCH format 2/2a/2b is used.

Additional Examples

Figure 12:
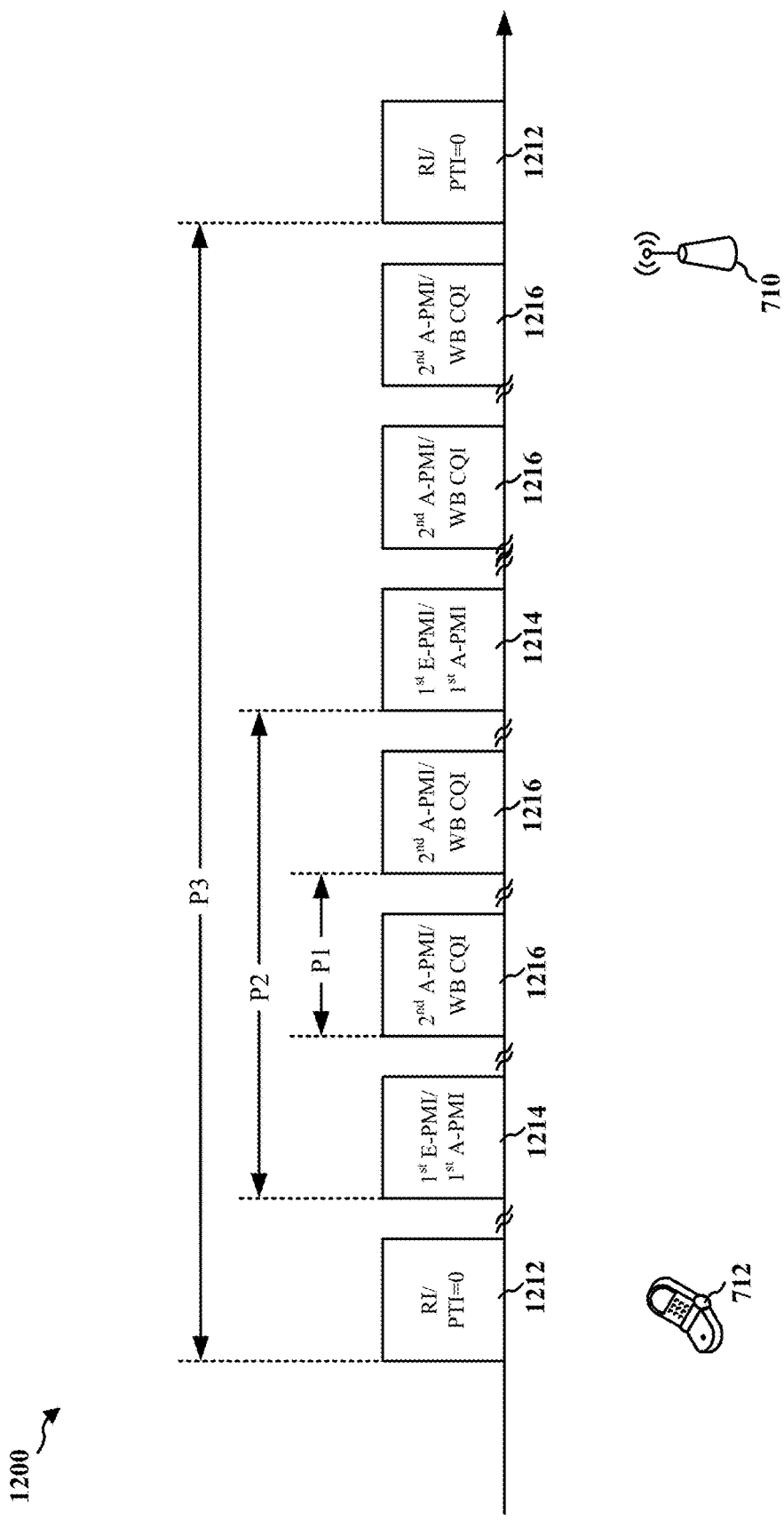
FIG. 12 is a diagram illustrating a CSI reporting technique in accordance with a first configuration.

FIG. 12 is a diagram 1200 illustrating a CSI reporting technique in accordance with the first configuration described supra. In this example, the PTI is 0. The UE 712 may use a first next generation PUCCH reporting mode 2-1 to transmit CSI reports to the eNB 710. More particularly, in this next generation PUCCH reporting mode, The UE 712 may start sending an RI/PTI report 1312 at a periodicity P3. Following the RI/PTI report 1712 and within a period defined by the periodicity P3, the UE 712 may start sending a first PMI report 1314 at a periodicity P2. There may be zero or more subframes between the RI/PTI report 1712 and the first PMI report 1314. Further, following the first PMI report 1314 and within a period defined by the periodicity P2, the UE 712 may start sending a second PMI/CQI report 1316 at a periodicity P1. There may be zero or more subframes between the first PMI report 1314 and the second PMI/CQI report 1316.

The periodicity P1 may define a period of $N_{pd}$ subframes. The periodicity P2 may define a period of $H \cdot N_{pd}$ subframes. The periodicity P3 may define a period of $M_{RI} \cdot H \cdot N_{pd}$ subframes. As an example, $M_{RI}$, H, and $N_{pd}$ each are integers greater than 0. As another example, $M_{RI}$, H, and $N_{pd}$ may be selected in accordance with 3GPP TS 36.213 V12.2.0 (2014-06), and particularly in accordance with section 7.2.2, "Periodic CSI Reporting using PUCCH." Each RI/PTI report 1312 may include an RI and a PTI and may be, for example, a standard type 6 CSI report. Each first PMI report 1314 may include a $1^{st}$ E-PMI and a $1^{st}$ A-PMI and may be, for example, a modified type 2a CSI report. Each second PMI/CQI report 1316 may include a $2^{nd}$ A-PMI and a wideband CQI and may be, for example, a standard type 2b CSI report.

Further, the first PMI report 1314 may have a payload size of 11 information bits. The $1^{st}$ A-PMI may be a wideband A-PMI and the $1^{st}$ E-PMI may be a wideband E-PMI. The $1^{st}$ A-PMI and the $1^{st}$ E-PMI combined together may use 6 bits. The $1^{st}$ A-PMI and the $1^{st}$ E-PMI may be jointly encoded. As an example, the $1^{st}$ A-PMI may use 4 information bits and the $1^{st}$ E-PMI may use 2 information bits. As such, the $1^{st}$ A-PMI and the $1^{st}$ E-PMI may be carried in the payload of the first PMI report 1314.

Figure 13:
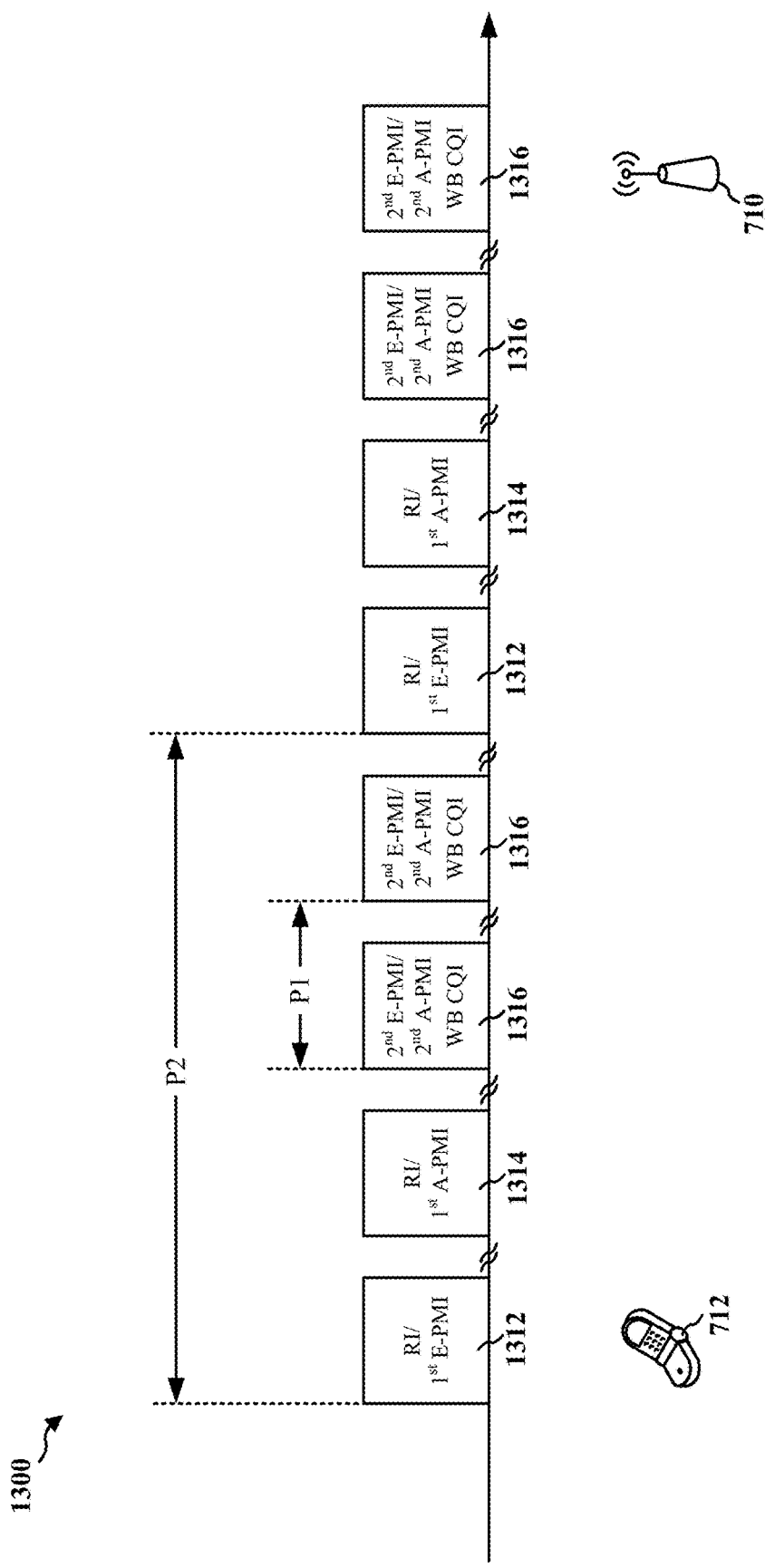
FIG. 13 is a diagram illustrating a CSI reporting technique in accordance with a second configuration.

FIG. 13 is a diagram 1300 illustrating a CSI reporting technique in accordance with the second configuration described supra. In this example, the UE 712 may use a PUCCH reporting mode 1-1 next generation submode 1 to transmit CSI reports to the eNB 710. More particularly, in this next generation submode, the UE 712 may start sending a pair of RI/E-PMI report 1212 and RI/A-PMI report 1214 at a periodicity P2. That is, the RI/E-PMI report 1212 and the RI/A-PMI report 1214 may be transmitted alternately. Although FIG. 13 shows that the RI/E-PMI report 1212 is transmitted prior to the RI/A-PMI report 1214, the RI/A-PMI report 1214 may be transmitted prior to the RI/E-PMI report 1212. There may be zero or more subframes between the RI/E-PMI report 1212 and the RI/A-PMI report 1214. Further, within a period defined by periodicity P2 and following the pair of the RI/E-PMI report 1212 and the RI/A-PMI report 1214, the UE 712 may start sending a PMI/CQI report 1216 at a periodicity P1. There may be zero or more subframes between the RI/A-PMI report 1214 and the PMI/CQI report 1216.

The periodicity P1 may define a period having $N_{pd}$ subframes. The periodicity P2 may define a period having $(M_{RI}+1) \cdot N_{pd}$ subframes. As an example, $M_{RI}$ and $N_{pd}$ each are integers greater than 0. As another example, $M_{RI}$ and $N_{pd}$ may be selected in accordance with 3GPP TS 36.213 V12.2.0 (2014-06), and particularly in accordance with section 7.2.2, "Periodic CSI Reporting using PUCCH."

Each RI/E-PMI report 1212 may include an RI and a $1^{st}$ E-PMI and may be, for example, a modified type 5 CSI report. Each RI/A-PMI report 1214 may include an RI and a $1^{st}$ A-PMI and may be, for example, a standard type 5 CSI report. Each PMI/CQI report 1216 may include a $2^{nd}$ E-PMI, a $2^{nd}$ A-PMI, and a wideband CQI. The PMI/CQI report 1216 may be, for example, a modified type 2b CSI report. Further, the PMI/CQI report 1216 may have a payload size of 11 information bits. The wideband CQI may use up to 7 information bits. Accordingly, the $2^{nd}$ E-PMI and the $2^{nd}$ A-PMI may be combined and down sampled such that the combined $2^{nd}$ E-PMI and $2^{nd}$ A-PMI together use 4 or less information bits. The $2^{nd}$ E-PMI and the $2^{nd}$ A-PMI may be jointly encoded. As such, the wideband CQI, the $2^{nd}$ A-PMI, and the $2^{nd}$ E-PMI may be carried in the payload of the PMI/CQI report 1216.

As illustrate in FIG. 13, the $1^{st}$ E-PMI and the $1^{st}$ A-PMI are alternately reported. Each of the $1^{st}$ E-PMI and the $1^{st}$ A-PMI may be jointly encoded with an RI. The RI/E-PMI report 1212 and the RI/A-PMI report 1214 in the same period defined by the periodicity P2 may include the same RI. Further, the UE 712 may jointly determine a $1^{st}$ E-PMI, a $1^{st}$ A-PMI, and an RI based on the same CSI-RS measurement. As such, the $1^{st}$ E-PMI and the $1^{st}$ A-PMI are reported to the eNB 710 through two separate reports (e.g., the RI/E-PMI report 1212 and the RI/A-PMI report 1214) within a period defined by the periodicity P2, and the two separate reports may both carry the same RI.

Figure 14:
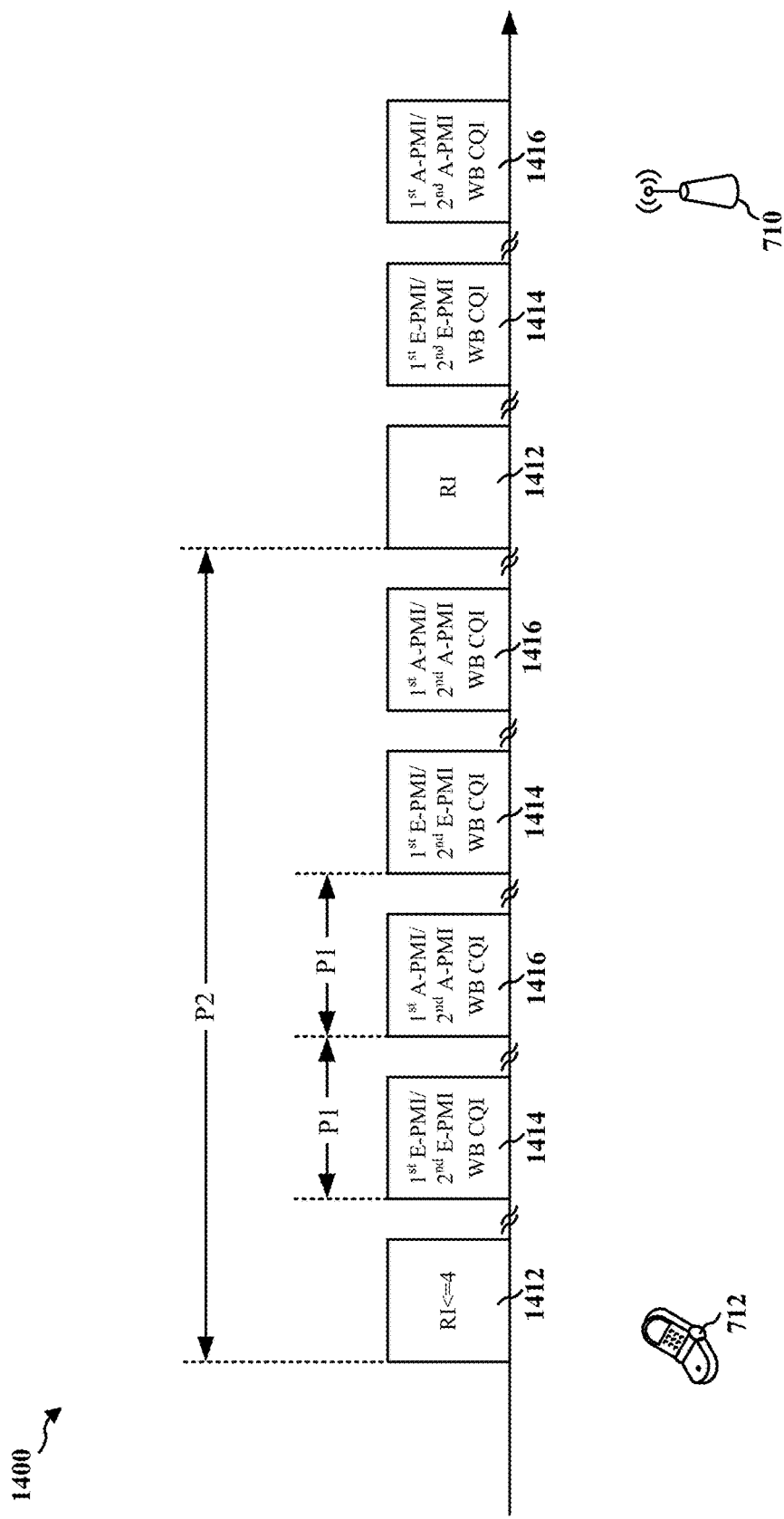
FIG. 14 is a diagram illustrating another CSI reporting technique in accordance with the second configuration.

FIG. 14 is a diagram 1400 illustrating another CSI reporting technique in accordance with the second configuration described supra. In this example, the RI is 4 or less. The UE 712 may use a first PUCCH reporting mode 1-1 next generation submode 2 to transmit CSI reports to the eNB 710. More particularly, in this next generation submode, the UE 712 may start sending an RI report 1412 at a periodicity P2. Further, within a period defined by the periodicity P2 and following the RI report 1412, the UE 712 may start sending an E-PMI/CQI report 1414 and an A-PMI/CQI report 1416, alternately, at a periodicity P1. In other words, the UE 712 may start sending the E-PMI/CQI report 1414 and the A-PMI/CQI report 1416 at a periodicity defining a period that is twice a period defined by the periodicity P1. Although FIG. 14 shows that the UE 712 initially send an E-PMI/CQI report 1414 subsequent to sending the RI report 1412, the UE 712 may, in alternative, initially send an A-PMI/CQI report 1416 (instead of an E-PMI/CQI report 1414) subsequent to sending the RI report 1412. There may be zero or more subframes between the RI report 1412 and the initial E-PMI/CQI report 1414 or between the RI report 1412 and the initial A-PMI/CQI report 1416.

The periodicity P1 may define a period of $N_{pd}$ subframes. The periodicity P2 may define a period of $M_{RI} \cdot N_{pd}$ subframes. As an example, $M_{RI}$ and $N_{pd}$ each are integers greater than 0. As another example, $M_{RI}$ and $N_{pd}$ may be selected in accordance with 3GPP TS 36.213 V12.2.0 (2014-06), and particularly in accordance with section 7.2.2, "Periodic CSI Reporting using PUCCH."

Each RI report 1412 may include an RI and may be, for example, a standard type 3 CSI report. Each E-PMI/CQI report 1414 may include a $1^{st}$ E-PMI, a $2^{nd}$ E-PMI, and a wideband CQI. The E-PMI/CQI report 1414 may be, for example, a modified type 2c CSI report. As an example, a standard type 2c CSI report may be modified to generate a modified type 2c CSI report. In the modified type 2c CSI report, the information bits that were designated to carry the $1^{st}$ A-PMI are used to carry the $1^{st}$ E-PMI, and the information bits that were designated to carry the $2^{nd}$ A-PMI are used to carry the $2^{nd}$ E-PMI. The wideband CQI is carried in the modified type 2c CSI report similarly as it would be carried in a standard type 2c CSI report.

Each A-PMI/CQI report 1416 may include a 1$^{st}$ A-PMI, a 2$^{nd}$ A-PMI, and a wideband CQI. The A-PMI/CQI report 1416 may be, for example, a standard type 2c CSI report.

Figure 15:
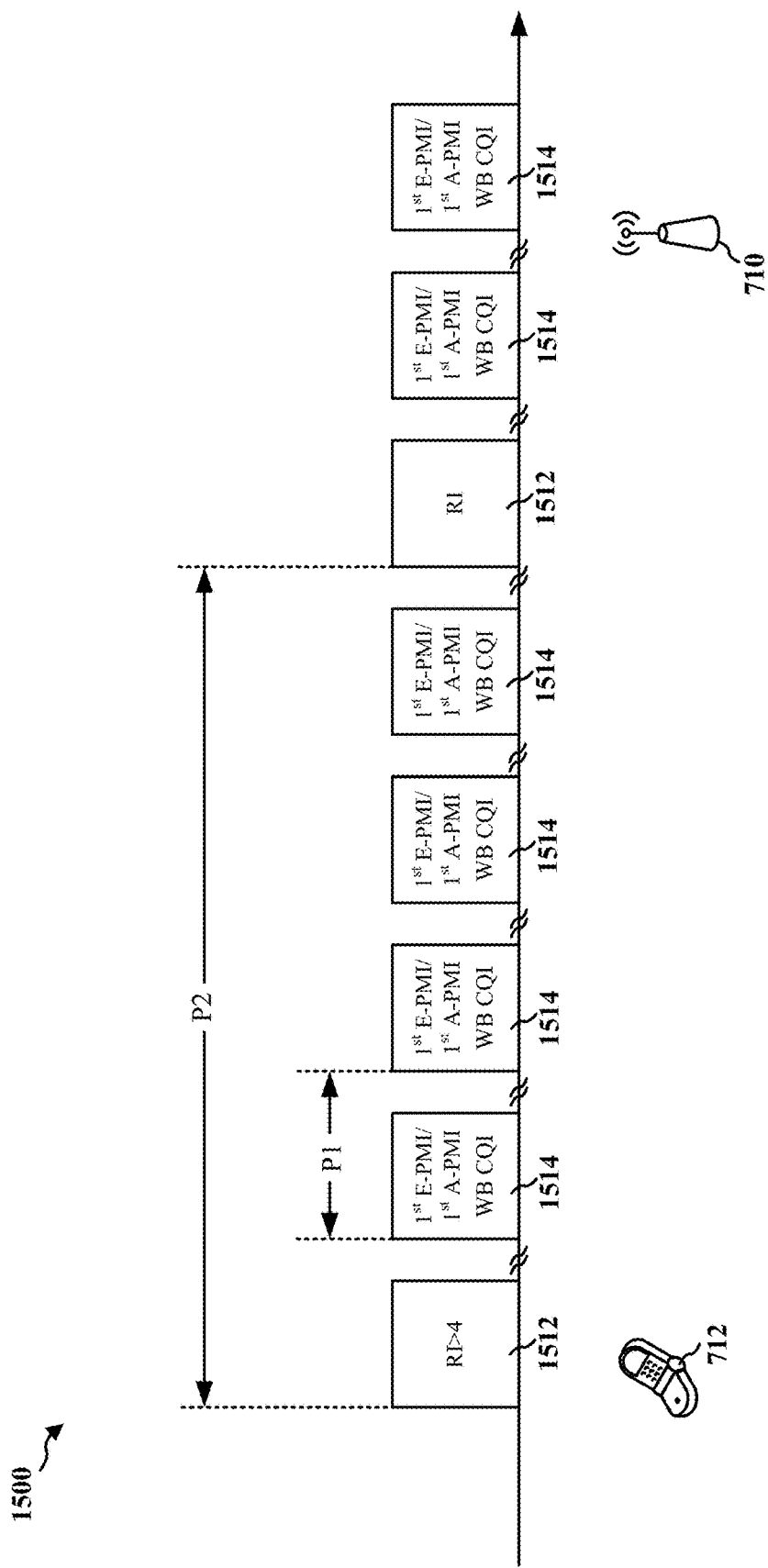
FIG. 15 is a diagram illustrating yet another CSI reporting technique in accordance with the second configuration.

FIG. 15 is a diagram 1500 illustrating yet another CSI reporting technique in accordance with the second configuration described supra. In this example, the RI is greater than 4. The UE 712 may also use the first PUCCH reporting mode 1-1 next generation submode 2 to transmit CSI reports to the eNB 710. When RI is greater than 4, the UE 712 may not transmit a 2$^{nd}$ A-PMI or a 2$^{nd}$ E-PMI. More particularly, the UE 712 may start sending an RI report 1512 at a periodicity P2. Further, within a period defined by the periodicity P2 and following the RI report 1512, the UE 712 may start sending a PMI/CQI report 1514 at a periodicity P1. There may be zero or more subframes between the RI report 1512 and the initial PMI/CQI report 1514.

The periodicity P1 may define a period of N$_{pd}$ subframes. The periodicity P2 may define a period of M$_{RI}$·N$_{pd}$ subframes. As an example, M$_{RI}$ and N$_{pd}$ each are integers greater than 0. As another example, M$_{RI}$ and N$_{pd}$ may be selected in accordance with 3GPP TS 36.213 V12.2.0 (2014-06), and particularly in accordance with section 7.2.2, "Periodic CSI Reporting using PUCCH."

Each RI report 1512 may include an RI and may be, for example, a standard type 3 CSI report. Each PMI/CQI report 1514 may include a 1$^{st}$ E-PMI, a 1$^{st}$ A-PMI, and a wideband CQI. The PMI/CQI report 1514 may be, for example, a modified type 2 CSI report. As an example, a standard type 2 CSI report may be modified to generate a modified type 2 CSI report. Particularly, the PMI/CQI report 1514 may have a payload size of 11 information bits. The wideband CQI may use up to 7 information bits. Accordingly, the 1$^{st}$ E-PMI and the 1$^{st}$ A-PMI may be combined and down sampled to use 4 or less information bits. As such, the wideband CQI, the 1$^{st}$ A-PMI, and the 1$^{st}$ E-PMI may be carried in the payload of the PMI/CQI report 1514.

Figure 16:
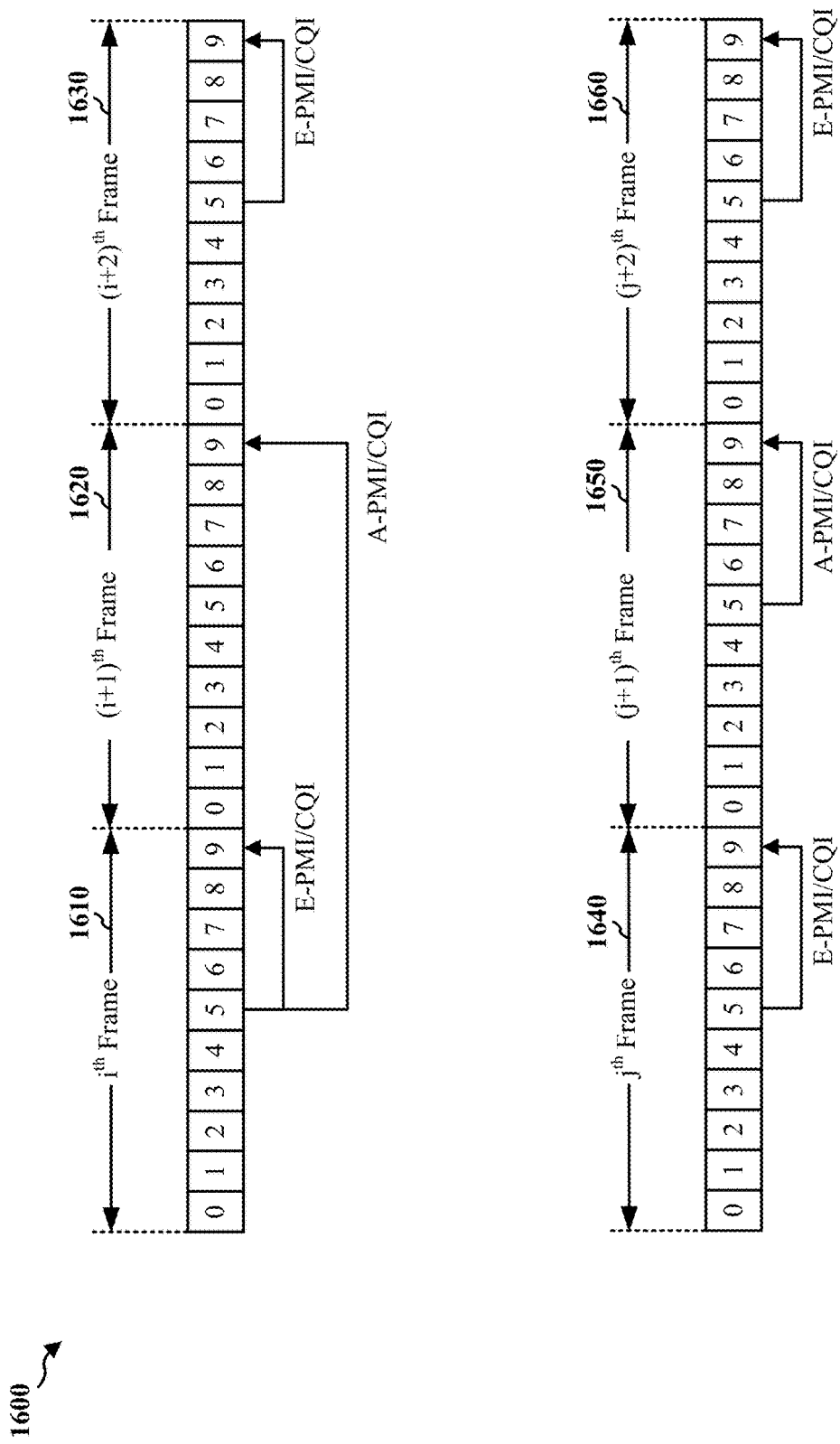
FIG. 16 is a diagram illustrating techniques for determining an elevation PMI (E-PMI), an azimuth PMI (A-PMI), and a channel quality indicator (CQI).

FIG. 16 is a diagram 1600 illustrating techniques for determining an E-PMI, an A-PMI, and a CQI. As described supra referring to FIGS. 13 and 14, the UE 712 may report a pair of two consecutive CSI reports one of which reports an E-PMI and the other one reports an A-PMI. More specifically, referring to FIG. 13, the UE 712 reports a pair of RI/E-PMI report 1212 and RI/A-PMI report 1214. The RI/E-PMI report 1212 includes a 1$^{st}$ E-PMI and the RI/A-PMI report 1214 includes a 2$^{nd}$ A-PMI. Referring to FIG. 14, the UE 712 reports a pair of E-PMI/CQI report 1414 and A-PMI/CQI report 1416. The E-PMI/CQI report 1414 includes, among others, a 1$^{st}$ E-PMI and a 2$^{nd}$ E-PMI. The A-PMI/CQI report 1416 includes, among others, a 1$^{st}$ A-PMI and a 2$^{nd}$ A-PMI.

In one technique, the UE 712 may measure CSI-RSs in a particular subframe. Based on the CSI-RSs from the particular subframe, the UE 712 may determine the E-PMI and the A-PMI. Further, the UE 712 may determine the CQI based on the E-PMI and the A-PMI derived from the particular subframe. The UE 712 may report the E-PMI and the wideband CQI in one report and may report the A-PMI and the wideband CQI in another report. As an example, the UE 712 may measure the CSI-RSs in the subframe 5 of an i$^{th}$ frame 1610 to determine an E-PMI, an A-PMI, and a wideband CQI. Subsequently, the UE 712 may transmit the E-PMI and the wideband CQI in a report (e.g., the E-PMI/CQI report 1414) in subframe 9 of the i$^{th}$ frame 1610. The UE 712 may transmit the A-PMI and the wideband CQI in a report (e.g., the A-PMI/CQI report 1416) in subframe 9 of an (i+1)$^{th}$ frame 1620. The UE 712 may measure the CSI-RSs in the subframe 5 of an (i+2)$^{th}$ frame 1630 again and repeat the process.

In another technique, the UE 712 may measure CSI-RSs in a first particular subframe to determine one of an E-PMI and an A-PMI (e.g., the E-PMI). Further, the UE 712 may determine a first CQI based on the E-PMI or A-PMI derived from the first particular subframe and the other one of the E-PMI and the A-PMI (e.g., the A-PMI) determined previously. The UE 712 may report the E-PMI or the A-PMI derived from the first particular subframe and the first CQI in one report. Subsequently, the UE 712 may measure CSI-RSs in a second particular subframe to determine the other one of the E-PMI and the A-PMI (e.g., the A-PMI). Further, the UE 712 may determine a second CQI based on the A-PMI or the E-PMI derived from the second particular subframe and the one derived from the first particular subframe. The UE 712 may report the A-PMI or the E-PMI derived from the second particular subframe and the second CQI in another report.

As an example, the UE 712 may determine an E-PMI based on CSI-RSs in the subframe 5 of as j$^{th}$ frame 1640. The UE 712 may determine a wideband CQI based on the E-PMI derived from the subframe 5 and an A-PMI determined previously. Then the UE 712 transmits the E-PMI and the wideband CQI in ones report (e.g., the E-PMI/CQI report 1414) in subframe 9 of the j$^{th}$ frame 1640.

Subsequently, the UE 712 may determine an A-PMI based on CSI-RSs in the subframe 5 of a (j+1)$^{th}$ frame 1650. The UE 712 may determine a wideband CQI based on the A-PMI derived from the subframe 5 of the (j+1)$^{th}$ frame 1650 and the E-PMI derived from the subframe 5 of the i$^{th}$ frame 1640. Then the UE 712 transmits the A-PMI and the wideband CQI in a report (e.g., the E-PMI/CQI report 1414) in subframe 9 of the (j+1)$^{th}$ frame 1650.

Subsequently, the UE 712 may determine an E-PMI based on CSI-RSs in the subframe 5 of a (j+2)$^{th}$ frame 1660. The UE 712 may determine a wideband CQI based on the E-PMI derived from the subframe 5 of the (j+2)$^{th}$ frame 1660 and the A-PMI derived from subframe 5 of the (j+1)$^{th}$ frame 1650. Then the UE 712 transmits the E-PMI and the wideband CQI in one report (e.g., the E-PMI/CQI report 1414) in subframe 9 of the (j+2)$^{th}$ frame 1660.

Figure 17:
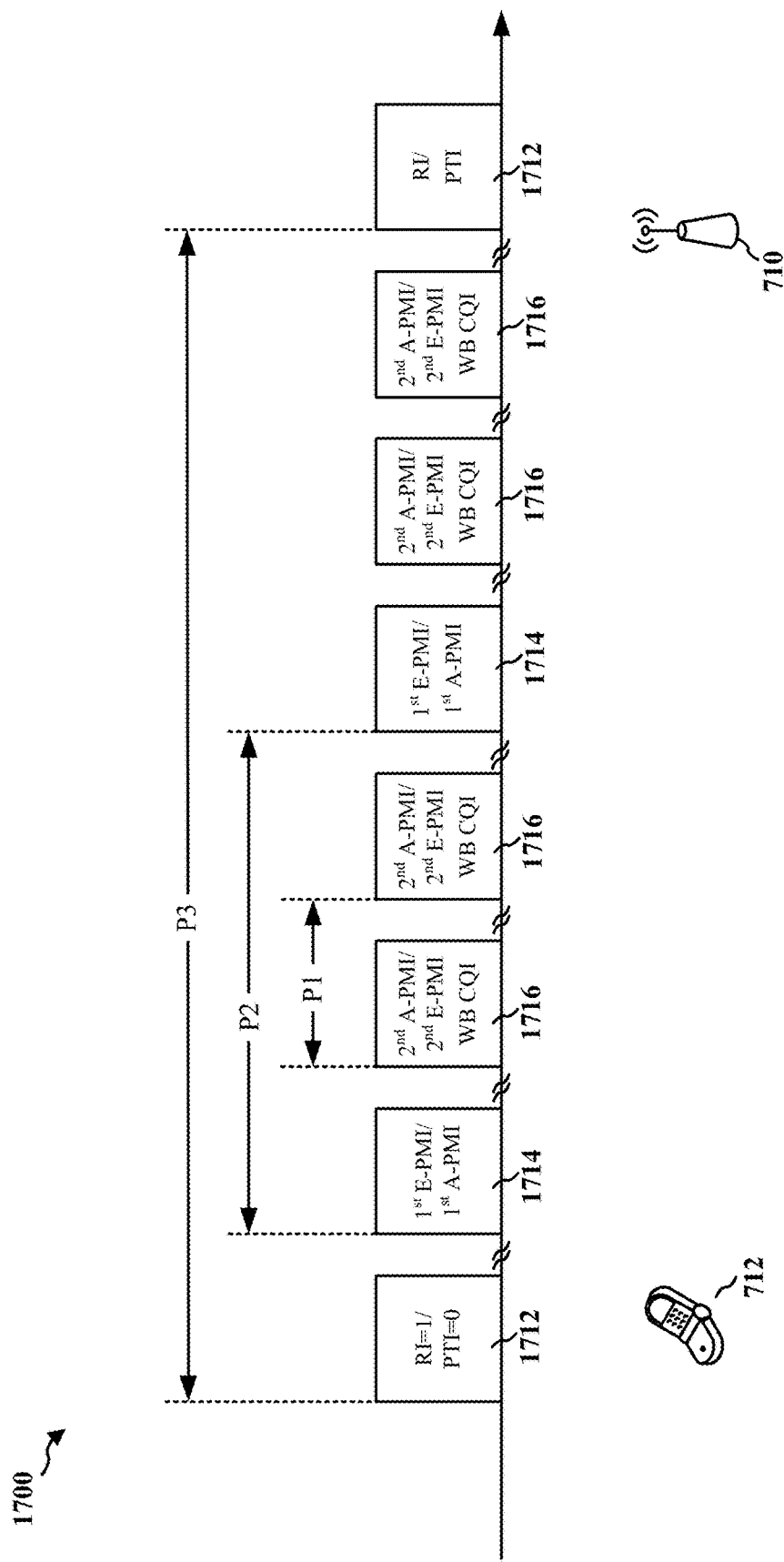
FIG. 17 is a diagram illustrating a CSI reporting technique in accordance with a third configuration.

FIG. 17 is a diagram 1700 illustrating a CSI reporting technique in accordance with the third configuration described supra. In this example, the PTI is 0 and the RI is 1. The UE 712 may use a second next generation PUCCH reporting mode 2-1 to transmit CSI reports to the eNB 710. More particularly, in this next generation PUCCH reporting mode, the UE 712 may start sending an RI/PTI report 1712 at a periodicity P3. Following the RI/PTI report 1712 and within a period defined by the periodicity P3, the UE 712 may start sending a first PMI report 1714 at a periodicity P2. There may be zero or more subframes between the RI/PTI report 1712 and the initial first PMI report 1714. Further, following the first PMI report 1714 and within a period defined by the periodicity P2, the UE 712 may start sending a second PMI/CQI report 1716 at a periodicity P1. There may be zero or more subframes between the initial first PMI report 1714 and the initial second PMI/CQI report 1716.

The periodicity P1 may define a period of N$_{pd}$ subframes. The periodicity P2 may define a period of H·N$_{pd}$ subframes. The periodicity P3 may define a period of M$_{RI}$·H·N$_{pd}$ subframes. As an example, M$_{RI}$, H, and N$_{pd}$ each are integers greater than 0. As another example, M$_{RI}$, H, and N$_{pd}$ may be selected in accordance with 3GPP TS 36.213 V12.2.0 (2014-06), and particularly in accordance with section 7.2.2, "Periodic CSI Reporting using PUCCH." Each RI/PTI report 1712 may include an RI and a PTI and may be, for example, a standard type 6 CSI report.

Each first PMI report 1714 may include a $1^{st}$ E-PMI and a $1^{st}$ A-PMI and may be, for example, a modified type 2a CSI report. Further, the first PMI report 1714 may have a payload size of 11 information bits. The $1^{st}$ A-PMI may be a wideband A-PMI and the $1^{st}$ E-PMI may be a wideband E-PMI. The $1^{st}$ A-PMI and the $1^{st}$ E-PMI combined together may use 6 information bits. As an example, the $1^{st}$ A-PMI may use 4 information bits and the $1^{st}$ E-PMI may use 2 information bits. As such, the $1^{st}$ A-PMI and the $1^{st}$ E-PMI may be carried in the payload of the first PMI report 1714.

Each second PMI/CQI report 1716 may include a $2^{nd}$ A-PMI, a $2^{nd}$ E-PMI, and a wideband CQI and may be, for example, a modified type 2b CSI report. Further, the second PMI/CQI report 1716 may have a payload size of 11 information bits. The wideband CQI may use 4 information bits. The $2^{nd}$ A-PMI may use 4 information bits. Accordingly, the remaining 3 information bits may be used for the $2^{nd}$ E-PMI.

Figure 18:
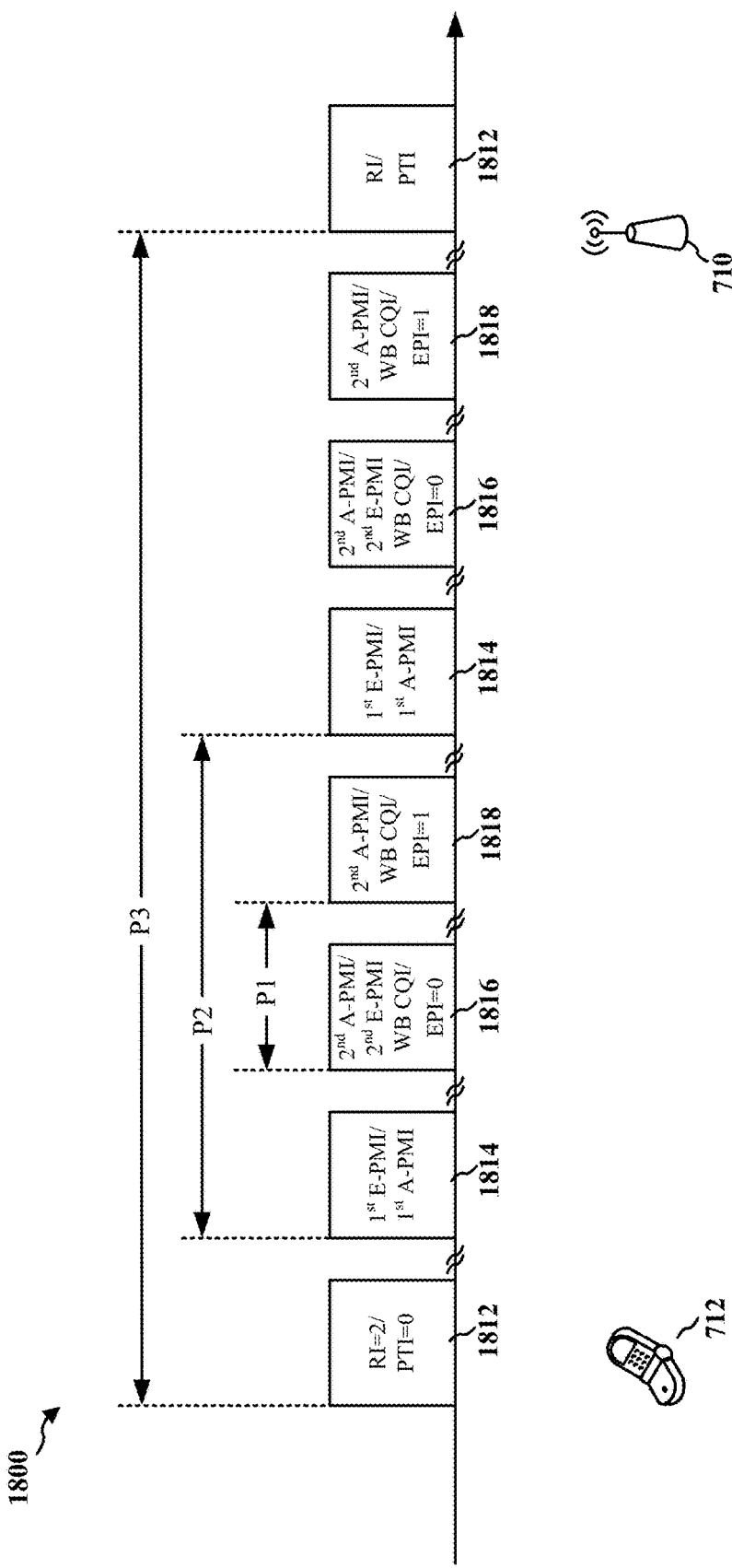
FIG. 18 is a diagram illustrating another CSI reporting technique in accordance with the third configuration.

FIG. 18 is a diagram 1800 illustrating another CSI reporting technique in accordance with the third configuration described supra. In this example, the PTI is 0 and the RI is greater than 1. More specifically, the RI may be 2. The UE 712 may use a third next generation PUCCH reporting mode 2-1 to transmit CSI reports to the eNB 710. More particularly, in this next generation PUCCH reporting mode, the UE 712 may start sending an RI/PTI report 1812 at a periodicity P3. Following the RI/PTI report 1812 and within a period defined by the periodicity P3, the UE 712 may start sending a first PMI report 1814 at a periodicity P2. There may be zero or more subframes between the RI/PTI report 1812 and the initial first PMI report 1814. Further, following the first PMI report 1814 and within a period defined by the periodicity P2, the UE 712 may start sending a second PMI/CQI report 1816 or a second PMI/CQI report 1818 at a periodicity P1. There may be zero or more subframes between the initial first PMI report 1814 and the initial second PMI/CQI report 1816 or second PMI/CQI report 1818.

The periodicity P1 may define a period of $N_{pd}$ subframes. The periodicity P2 may define a period of $H \cdot N_{pd}$ subframes. The periodicity P3 may define a period of $M_{RI} \cdot H \cdot N_{pd}$ subframes. As an example, $M_{RI}$, H, and $N_{pd}$ each are integers greater than 0. As another example, $M_{RI}$, H, and $N_{pd}$ may be selected in accordance with 3GPP TS 36.213 V12.2.0 (2014-06), and particularly in accordance with section 7.2.2, "Periodic CSI Reporting using PUCCH."

Each RI/PTI report 1812 may include an RI and a PTI and may be, for example, a standard type 6 CSI report. Each first PMI report 1814 may include a $1^{st}$ E-PMI and a $1^{st}$ A-PMI and may be, for example, a modified type 2a CSI report. Further, the first PMI report 1814 may have a payload size of 11 information bits. The $1^{st}$ A-PMI may be a wideband A-PMI and the $1^{st}$ E-PMI may be a wideband E-PMI. The $1^{st}$ A-PMI and the $1^{st}$ E-PMI combined together may use 6 bits. As an example, the $1^{st}$ A-PMI may use 4 information bits and the $1^{st}$ E-PMI may use 2 information bits. As such, the $1^{st}$ A-PMI and the $1^{st}$ E-PMI may be carried in the payload of the first PMI report 1814.

Each second PMI/CQI report 1816 may include a $2^{nd}$ A-PMI, a $2^{nd}$ E-PMI, an EPI, and a wideband CQI. The second PMI/CQI report 1816 may be, for example, a modified type 2b CSI report. Further, the second PMI/CQI report 1816 may have a payload size of 11 information bits. The wideband CQI may use 4 information bits. The $2^{nd}$ A-PMI may use 4 information bits. One bit of the remaining 3 information bits may be used as an EPI to indicate that the other two information bits are used to carry a $2^{nd}$ E-PMI. In this example, the UE 712 sets the EPI of the second PMI/CQI report 1816 as 0 to indicate that the other two information bits are used to carry a $2^{nd}$ E-PMI. Accordingly, the other two information bits carry the $2^{nd}$ E-PMI.

Each second PMI/CQI report 1818 may include a $2^{nd}$ A-PMI, a wideband CQI, an EPI, and a spatial differential CQI. The second PMI/CQI report 1818 may be, for example, a modified type 2b CSI report. Further yet, the second PMI/CQI report 1818 may have a payload size of 11 information bits. The wideband CQI may use 4 information bits. The $2^{nd}$ A-PMI may use 4 information bits. One bit of the remaining 3 information bits may be used as an EPI to indicate that the other two information bits are used to carry a spatial differential CQI. In this example, the UE 712 sets the EPI of the second PMI/CQI report 1816 as 1 to indicate that the other two information bits are used to carry a $2^{nd}$ E-PMI. Accordingly, the other two information bits carry the spatial differential CQI.

Figure 19:
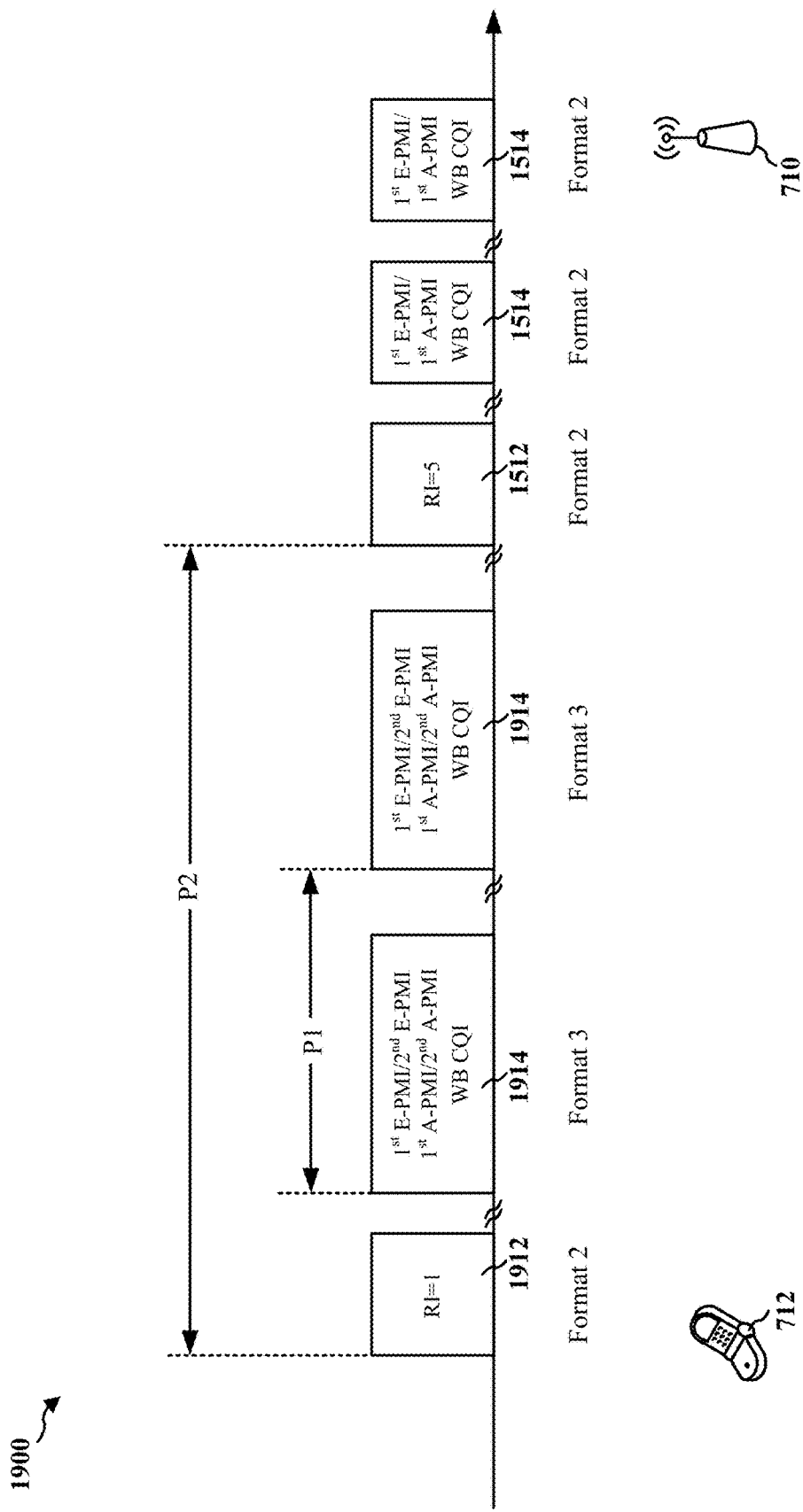
FIG. 19 is a diagram illustrating a CSI reporting technique in accordance with a fifth configuration.

FIG. 19 is a diagram 1900 illustrating a CSI reporting technique in accordance with the fifth configuration. In this example, the RI is 4 or less. More specifically, the RI may be 1. The UE 712 may use a second PUCCH reporting mode 1-1 next generation submode 2 to transmit CSI reports to the eNB 710. More particularly, in this next generation submode, the UE 712 may start sending an RI report 1912 at a periodicity P2. Further, within a period defined by the periodicity P2 and following the RI report 1912, the UE 712 may start sending an E-PMI/CQI report 1914 at a periodicity P1. There may be zero or more subframes between the RI report 1912 and the initial E-PMI/CQI report 1914.

The periodicity P1 may define a period of $N_{pd}$ subframes. The periodicity P2 may define a period of $M_{RI} \cdot N_{pd}$ subframes. As an example, $M_{RI}$ and $N_{pd}$ each are integers greater than 0. As another example, $M_{RI}$ and $N_{pd}$ may be selected in accordance with 3GPP TS 36.213 V12.2.0 (2014-06), and particularly in accordance with section 7.2.2, "Periodic CSI Reporting using PUCCH."

Each RI report 1912 may include an RI and may be, for example, a standard type 3 CSI report in PUCCH format 2. Each E-PMI/CQI report 1914 may include a $1^{st}$ E-PMI, a $2^{nd}$ E-PMI, a $1^{st}$ A-PMI, a $2^{nd}$ A-PMI, and a wideband CQI, which in combination may use more than 11 information bits. Accordingly, the UE 712 may use, for example, a modified type 2c CSI report in PUCCH format 3, which may have a payload size of up to 22 information bits, to carry the $1^{st}$ E-PMI, the $2^{nd}$ E-PMI, the $1^{st}$ A-PMI, the $2^{nd}$ A-PMI, and the wideband CQI.

Subsequently, the UE 712 may determine that the RI is greater than 4. More specifically, the RI may be 5. Accordingly, the UE 712 may not transmit a $2^{nd}$ E-PMI and a $2^{nd}$ A-PMI to the eNB 710. In other words, the UE 712 may transmit the $1^{st}$ E-PMI, the $1^{st}$ A-PMI, and the wideband CQI to the eNB 710. As described supra referring to FIG. 15, the UE 712 may transmit the $1^{st}$ E-PMI, the $1^{st}$ A-PMI, and the wideband CQI in a modified type 2 CSI report in PUCCH format 2. Thus, the UE 712 may use the first PUCCH reporting mode 1-1 next generation submode 2 to transmit a RI report 1512 and a PMI/CQI report 1514 as described supra referring to FIG. 15.

As described supra, the UE 712 may transmit to the eNB 710 one or more of a modified type 5 CSI report (e.g., the RUE-PMI report 1212), a modified type 2c CSI report (e.g., the E-PMI/CQI report 1414, the E-PMI/CQI report 1914), a modified type 2 CSI report (e.g., the PMI/CQI report 1514), a modified type 2a CSI report (e.g., the first PMI report 1314), and a modified type 2b CSI report (e.g., the PMI/CQI report 1216, the second PMI/CQI report 1716, the second PMI/CQI report 1816).

In certain circumstances, the UE 712 may be requested to transmit more than one CSI reports in a single subframe. For example, the UE 712 may communicate with the eNB 710 and other eNodeBs through a coordinated multipoint (CoMP) operation. The UE 712 may operate multiple processes to receive DL traffic. For each process, the UE 712 may need to transmit CSI reports. Further, the UE 712 may receive DL traffic from the eNB 710 through carrier aggregation utilizing multiple carriers. For each carrier, the UE 712 may need to transmit CSI reports.

As such, when two CSI reports in collision are for the same serving cell (carrier), the UE 712 may assign all standard CSI reports, modified CSI reports, and next generation CSI reports that carry an RI to a priority group 1. Accordingly, the modified type 5 CSI report may be assigned to the priority group 1. Further, the UE 712 may assign all other standard CSI reports, modified CSI reports, and next generation CSI reports that do not carry an RI to a priority group 2.

When two CSI reports in collision are for different serving cells (carriers), the UE 712 may assign all standard CSI reports, modified CSI reports, and next generation CSI reports that carry an RI or that carry both a $1^{st}$ E-PMI and a $1^{st}$ A-PMI to a priority group 1. Accordingly, the modified type 5 CSI report and the modified type 2a CSI report may be assigned to the priority group 1. Further, the UE 712 may assign all remaining standard CSI reports, modified CSI reports, and next generation CSI reports that carry a wideband CQI to a priority group 2. Accordingly, the modified type 2c CSI report, the modified type 2 CSI report, and the modified type 2b CSI report, may be assigned to the priority group 2. Further, the UE 712 may assign all remaining standard CSI reports, modified CSI reports, and next generation CSI reports that carry a subband CQI to a priority group 3.

The CSI reports in the priority group 1 have a priority higher than the CSI reports in the priority group 2; the CSI reports in the priority group 2 have a priority higher than the CSI reports in the priority group 3. That is, when the UE 712 is requested to send a CSI report of the priority group 1 and a CSI report of the priority group 2 in the same subframe, the UE 712 will send the CSI report of the priority group 1 and not send the CSI report of the priority group 2 in the subframe. Further, when the UE 712 is requested to send two CSI reports of a same priority group, the UE 712 may further determine the priorities of the two CSI reports based on a CSI process index and a subframe set index for each CSI report.

Figure 20:
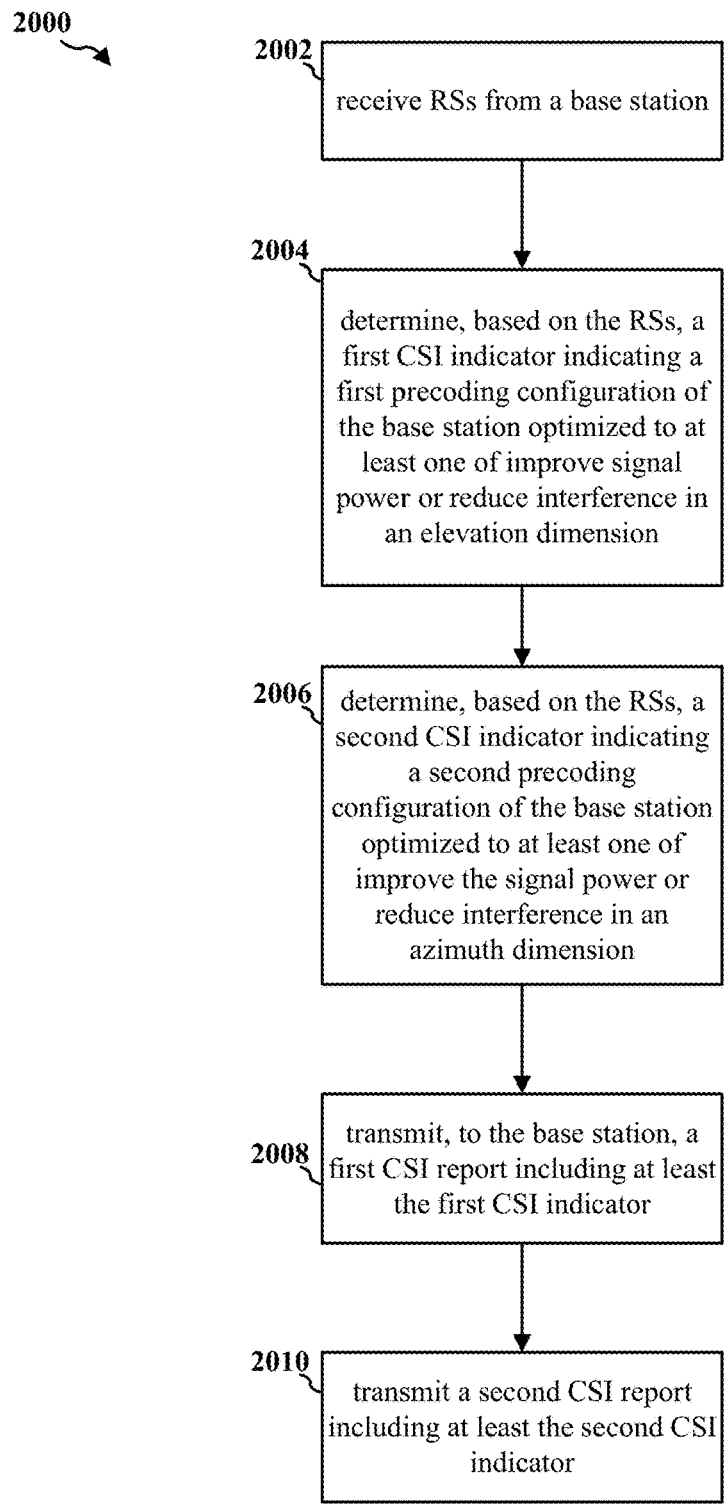
FIG. 20 is a flow chart of a method (process) for reporting an E-PMI.

FIG. 20 is a flow chart 2000 of a method (process) for reporting an E-PMI. The method may be performed by a UE (e.g., the UE 102, the UE 206, UE 712, the apparatus 2602/2602').

At operation 2002, the UE receives RSs from a base station. For example, referring to FIG. 7, the UE 712 receives RSs from the eNB 710.

At operation 2004, the UE determines, based on the RSs, a first CSI indicator indicating a first precoding configuration of the base station optimized to at least one of improve signal power or reduce interference in an elevation dimension. In certain configurations, the first CSI indicator includes an E-PMI. For example, referring to FIG. 7, the precoding configurations used by the eNB 710 may implement dynamic beam steering in a vertical dimension (or an elevation dimension). Substantial capacity improvement and significant gain of interference avoidance can be achieved by exploiting the additional elevation dimension inherent in a MIMO wireless system. For example, the precoding configurations may reduce elevation dimension interference among the signal streams 733, 734, 735, 736 at the receiver 714. Accordingly, the corresponding PMI used to indicate such a precoding configuration or codeword with respect to the elevation dimension may be referred to as an E-PMI.

At operation 2006, the UE determines, based on the RSs, a second CSI indicator indicating a second precoding configuration of the base station optimized to at least one of improve the signal power or reduce interference in an azimuth dimension. In certain configurations, the second CSI indicator includes an A-PMI. For example, referring to FIG. 7, the UE 712 may also determine an A-PMI based on the RSs.

At operation 2008, the UE transmits, to the base station, a first CSI report including the first CSI indicator. In certain configurations, the UE, at operation 2010, transmits, to the base station, a second CSI report including the second CSI indicator. The first CSI report and the second CSI report are transmitted alternately. In certain configurations, the first CSI report is transmitted to the base station on a PUCCH. For example, referring to FIG. 7, the UE 712 may transmit CSI reports 760 to the eNB 710 on a physical uplink control channel (PUCCH) periodically.

In certain configurations, the E-PMI and the A-PMI each include a wideband PMI. In certain configurations, the first CSI indicator and the second CSI indicator are jointly encoded and are both included in the first CSI report. For example, referring to FIG. 12, the $1^{st}$ A-PMI and the $1^{st}$ E-PMI may be jointly encoded in the first PMI report 1314.

In certain configurations, a payload size of the first CSI report is not greater than 11 information bits. In certain configurations, the first CSI report further includes the second CSI indicator. The first CSI indicator and the second CSI indicator together have no more than 6 information bits. In certain configurations, the first CSI indicator has 2 information bits and the second CSI indicator has 4 information bits. For example, referring to FIG. 12, the $1^{st}$ A-PMI and the $1^{st}$ E-PMI in the first PMI report 1314 combined together may use 6 bits.

In certain configurations, the first CSI report further includes an RI. In certain configurations, the first CSI indicator includes a first E-PMI. For example, referring to FIG. 13, each RI/E-PMI report 1212 may include an RI and a $1^{st}$ E-PMI.

In certain configurations, the first CSI report further includes the second CSI indicator and a CQI. In certain configurations, the first CSI indicator includes a first E-PMI. The second CSI indicator includes a first A-PMI. The first CSI indicator and the second CSI indicator together have no more than 4 information bits. For example, referring to FIG. 15, each PMI/CQI report 1514 may include a $1^{st}$ E-PMI, a $1^{st}$ A-PMI, and a wideband CQI.

In certain configurations, the first CSI report includes a CQI that is determined based on the second CSI indicator and the first CSI indicator. In certain configurations, the first CSI indicator and the second CSI indicator are determined based on the RSs received in a same subframe. For example, referring to FIG. 16, a CQI is determined based on the E-PMI and the A-PMI derived from subframe 5 of the $i^{th}$ frame 1610. In certain configurations, the first CSI indicator and the second CSI indicator are determined based on the RSs received in different subframes. For example, referring to FIG. 16, a CQI is determined based on the E-PMI drive from the subframe 5 of the $j^{th}$ frame 1640 and the A-PMI derived from subframe 5 of the $(j+1)^{th}$ frame 1650.

In certain configurations, the first CSI report further includes the second CSI indicator. The first CSI indicator and the second CSI indicator together have no more than 6 information bits. In certain configurations, the first CSI indicator has 2 information bits and the second CSI indicator has 4 information bits. In certain configurations, the first CSI indicator includes a first E-PMI. The second CSI indicator includes a first A-PMI. For example, referring to FIG. 12, the $1^{st}$ A-PMI and the $1^{st}$ E-PMI in the first PMI report 1314 combined together may use 6 bits.

In certain configurations, the first CSI report further includes the second CSI indicator and a wideband CQI. The first CSI indicator and the second CSI indicator together have no more than 4 information bits. In certain configurations, the first CSI indicator includes a second E-PMI and the second CSI indicator includes a second A-PMI. In certain configurations, the first CSI report includes an E-PMI indicator and a data unit. The E-PMI indicator indicates whether the data unit carries an E-PMI or a spatial differential channel quality indicator (CQI). For example, referring to FIG. 18, each second PMI/CQI report 1816 may include a $2^{nd}$ A-PMI, a $2^{nd}$ E-PMI, an EPI, and a wideband CQI.

In certain configurations, a PUCCH established between the UE and the base station has a plurality of resources corresponding to a plurality of values. The first CSI report is transmitted on a resource of the plurality of resources corresponding to a value of the first CSI indicator. In certain configurations, a payload size of the first CSI report is up to 13 information bits. The first CSI report is transmitted on a PUCCH using PUCCH format 2. The first CSI report includes the first CSI indicator, the second CSI indicator, and a CQI. In certain configurations, a payload size of the first CSI report is up to 22 information bits. The first CSI report is transmitted on a PUCCH using PUCCH format 3. The first CSI report includes the first CSI indicator, the second CSI indicator, and a CQI. For example, referring to FIG. 19, each RI report 1912 may be in PUCCH format 3 and may have a payload size of up to 22 information bits.

Figure 21:
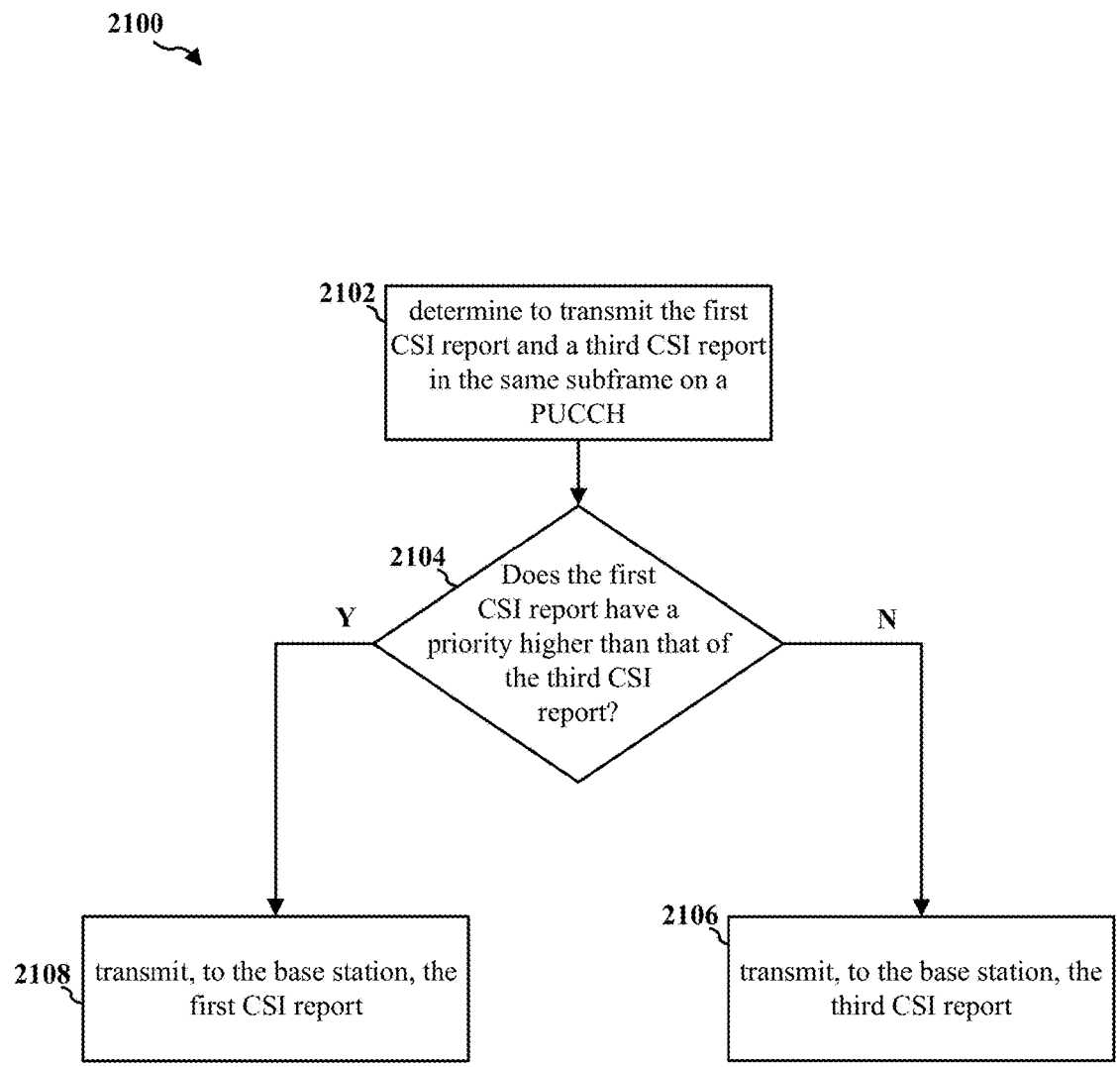
FIG. 21 is a flow chart of a method (process) for determining priorities of CSI reports.

FIG. 21 is a flow chart 2000 of a method (process) for determining priorities of CSI reports. The method may be performed by an apparatus. The apparatus may be a UE (e.g., the UE 102, the UE 206, UE 712, the apparatus 2602/2602'). The method may be performed by the UE prior to operation 2008.

At operation 2102, the UE determines to transmit the first CSI report and a third CSI report in a same particular subframe on a PUCCH. At operation 2104, the UE determines whether the first CSI report has a priority higher than that of the third CSI report based on a priority rule. When the first CSI report is determined to have a priority higher than that of the third CSI report, the UE enters operation 2008 and transmits the first CSI report to the base station in the particular subframe. When the first CSI report is determined to have a priority not higher than that of the third CSI report, the UE, at operation 2106, transmits the third CSI report to the base station in the particular subframe.

The priority rule defines, within a same serving cell, a CSI report carrying an RI has a priority higher than that of a CSI report not carrying an RI. The priority rule also defines, within different serving cells, a CSI report carrying an RI and one of a first A-PMI and a first E-PMI and a CSI report carrying both a first A-PMI and a first E-PMI each have a priority higher than that of a CSI report not carrying (i) an RI and one of an A-PMI and an E-PMI or (ii) both a first A-PMI and a first E-PMI. For example, referring to FIG. 7, the UE 712 determines priority groups of CSI reports in collision.

Figure 22:
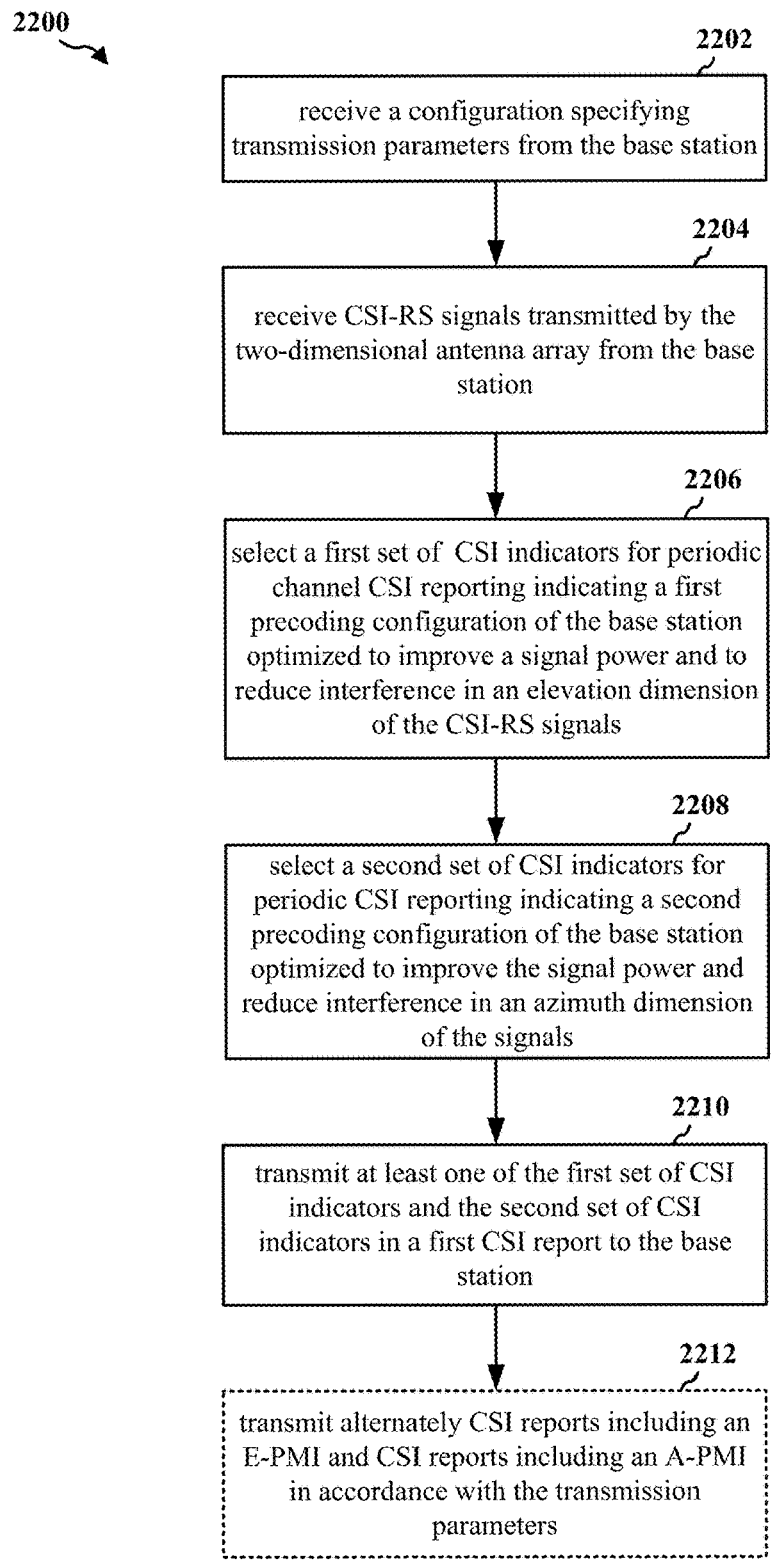
FIG. 22 is a flow chart of a method (process) for transmitting an E-PMI and an A-PMI.

FIG. 22 is a flow chart 2200 of a method (process) for transmitting an E-PMI and an A-PMI. The method may be performed by a UE (e.g., the UE 712, the apparatus 2602/2602'). The UE communicates with a base station having a two-dimensional antenna array. At operation 2202, the UE may receive a configuration from the base station. The configuration specifies transmission parameters for transmitting a first set of CSI indicators and a second set of CSI indicators to the base station. The parameters indicate at least one of a reporting periodicity and a subframe offset. At operation 2204, the UE receives CSI-RS signals transmitted by the two-dimensional antenna array from the base station. At operation 2206, the UE selects the first set of CSI indicators for periodic channel CSI reporting indicating a first precoding configuration of the base station optimized to improve signal power and to reduce interference in an elevation dimension of the CSI-RS signals. At operation 2208, the UE selects a second set of CSI indicators for periodic CSI reporting indicating a second precoding configuration of the base station optimized to improve the signal power and reduce interference in an azimuth dimension of the CSI-RS signals. At operation 2210, the UE transmits at least one of the first set of CSI indicators and the second set of CSI indicators in a first CSI report to the base station. In one configuration, at operation 2212, the UE may transmit alternately CSI reports including an E-PMI and CSI reports including an A-PMI in accordance with the transmission parameters.

In one configuration, the first set of CSI indicators includes a first E-PMI. The second set of CSI indicators includes a first A-PMI. The first CSI report further includes at least one of an RI and a CQI. In one configuration, the first set of CSI indicators and the second set of CSI indicators are jointly encoded and are both included in the first CSI report.

In one configuration, the first E-PMI and first A-PMI each include at least one of a wideband PMI and a subband PMI. In one configuration, the first CSI report is transmitted to the base station on a PUCCH. A payload size of the first CSI report is not greater than 13 information bits. The first E-PMI and the first A-PMI together have no more than 6 information bits.

In one configuration, the first CSI report is transmitted to the base station on a PUCCH. A payload size of the first CSI report is greater than 13 information bits. The first E-PMI and the first A-PMI each have no more than 4 information bits.

In one configuration, a PUCCH established between the UE and the base station has a plurality of resources. The plurality of resources correspond to a plurality of values. The first E-PMI has first value of the plurality of values. The first CSI report is transmitted on a resource of the plurality of resources corresponding to the first value.

Figure 23:
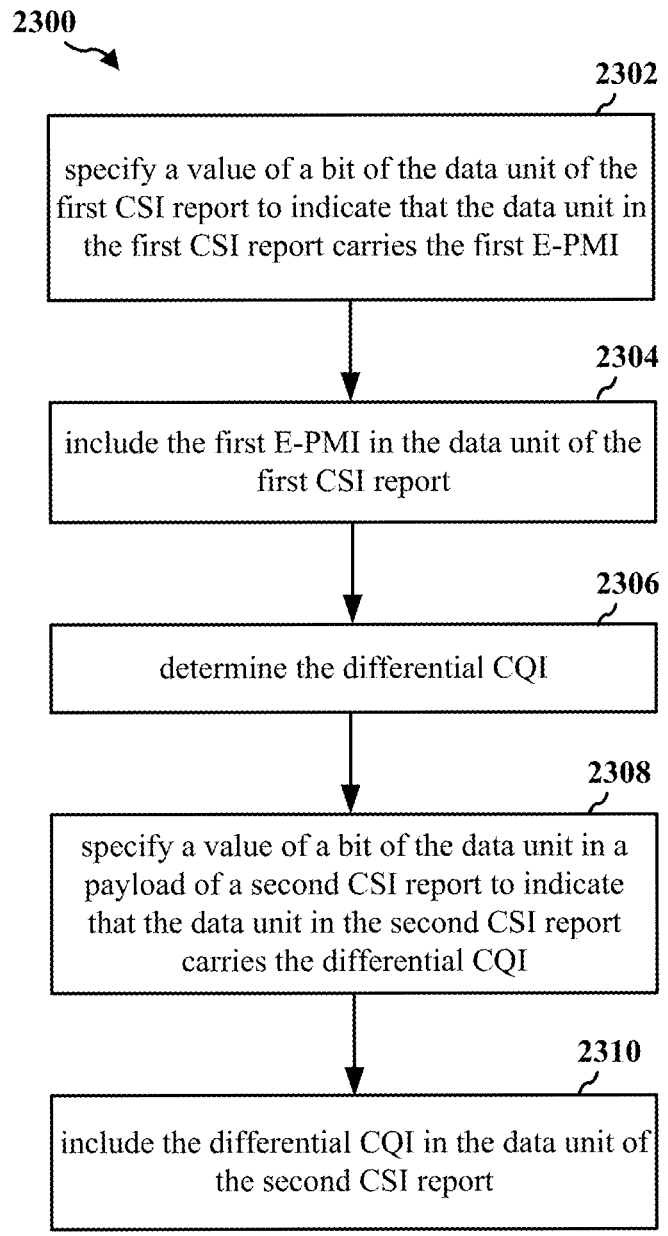
FIG. 23 is a flow chart of a method (process) for reporting a modified CSI report.

FIG. 23 is a flow chart 2300 of a method (process) for reporting a modified CSI report. The method may be performed by a UE (e.g., the UE 712, the apparatus 2602/2602'). This method may be performed within the operation 2312 illustrated in FIG. 23. In one configuration, the first E-PMI is a wideband E-PMI and the first A-PMI is a wideband A-PMI. A payload of the first CSI report includes a data unit. At operation 2302, the UE may specify a value of a bit of the data unit of the first CSI report to indicate that the data unit in the first CSI report carries the first E-PMI.

At operation 2304, the UE may include the first E-PMI in the data unit of the first CSI report. The first CSI report does not include a differential CQI.

At operation 2306, the UE may determine the differential CQI. At operation 2308, the UE may specify a value of a bit of the data unit in a payload of a second CSI report to indicate that the data unit in the second CSI report carries the differential CQI. At operation 2310, the UE may include the differential CQI in the data unit of the second CSI report. The second CSI report does not include the first E-PMI.

Figure 24:
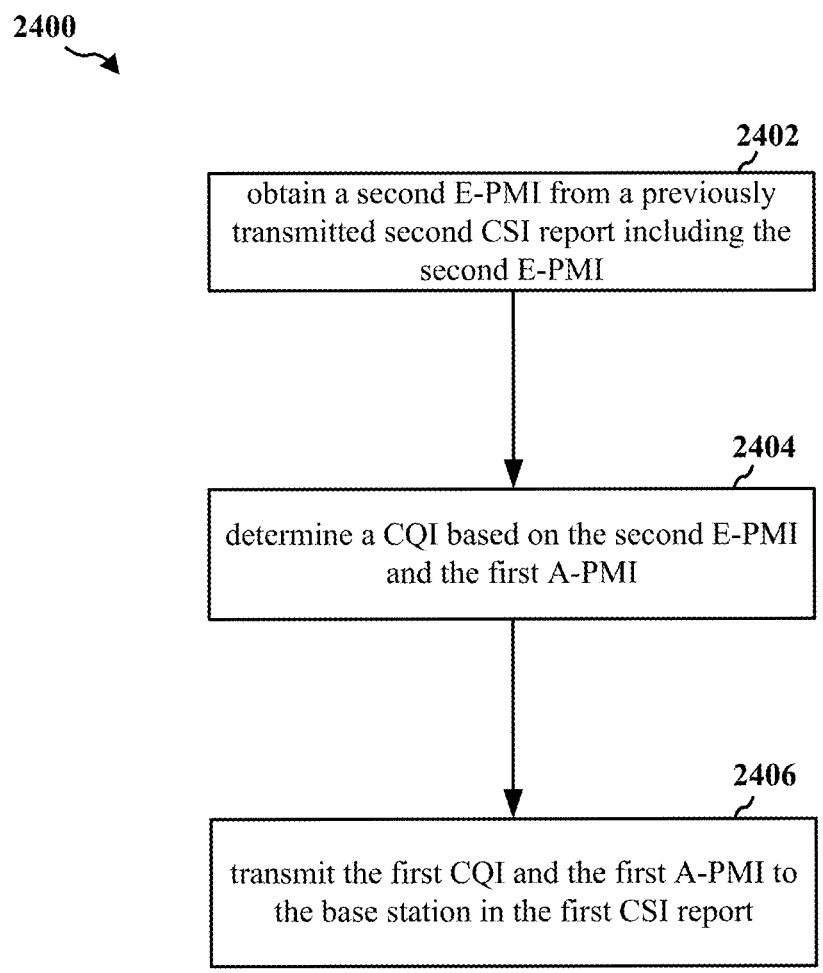
FIG. 24 is a flow chart of a method (process) for determining a CQI.

FIG. 24 is a flow chart 2400 of a method (process) for determining a CQI. The method may be performed by a UE (e.g., the UE 712, the apparatus 2602/2602'). This method may be performed within the operation 1210 illustrated in FIG. 12. At operation 2402, the UE may obtain a second E-PMI from a previously transmitted second CSI report including the second E-PMI. At operation 2404, the UE may determine a CQI based on the second E-PMI and the first A-PMI. At operation 2406, the UE may transmit the CQI and the first A-PMI to the base station in the first CSI report.

In one configuration, the second E-PMI includes a wideband E-PMI. The first A-PMI includes a wideband A-PMI. In one configuration, the second E-PMI includes a subband E-PMI. The A-PMI includes a wideband A-PMI. In one configuration, the second E-PMI includes a wideband E-PMI. The first A-PMI includes a subband A-PMI.

Figure 25:
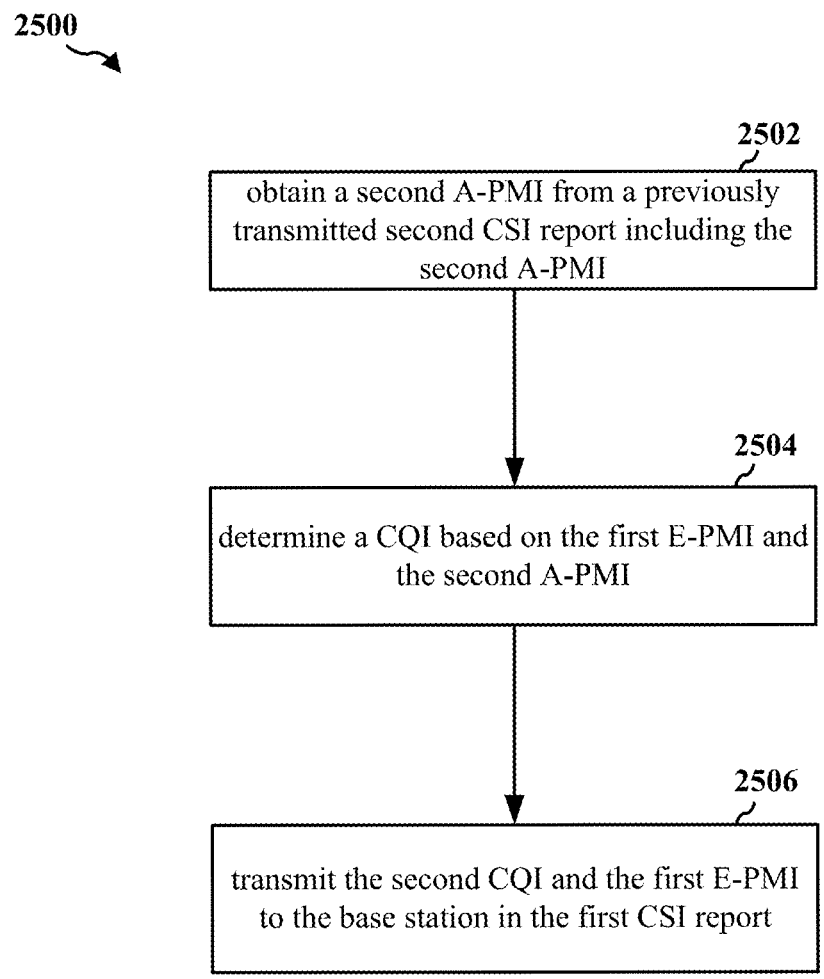
FIG. 25 is a flow chart of another method (process) for determining a CQI.

FIG. 25 is a flow chart 2500 of another method (process) for determining a CQI. The method may be performed by a UE (e.g., the UE 712, the apparatus 2602/2602'). This method may be performed within the operation 1210 illustrated in FIG. 12. At operation 2502, the UE may obtain a second A-PMI from a previously transmitted second CSI report including the second A-PMI. At operation 2504, the UE may determine a CQI based on the first E-PMI and the second A-PMI. At operation 2506, the UE may transmit the CQI and the first E-PMI to the base station in the first CSI report.

Figure 26:
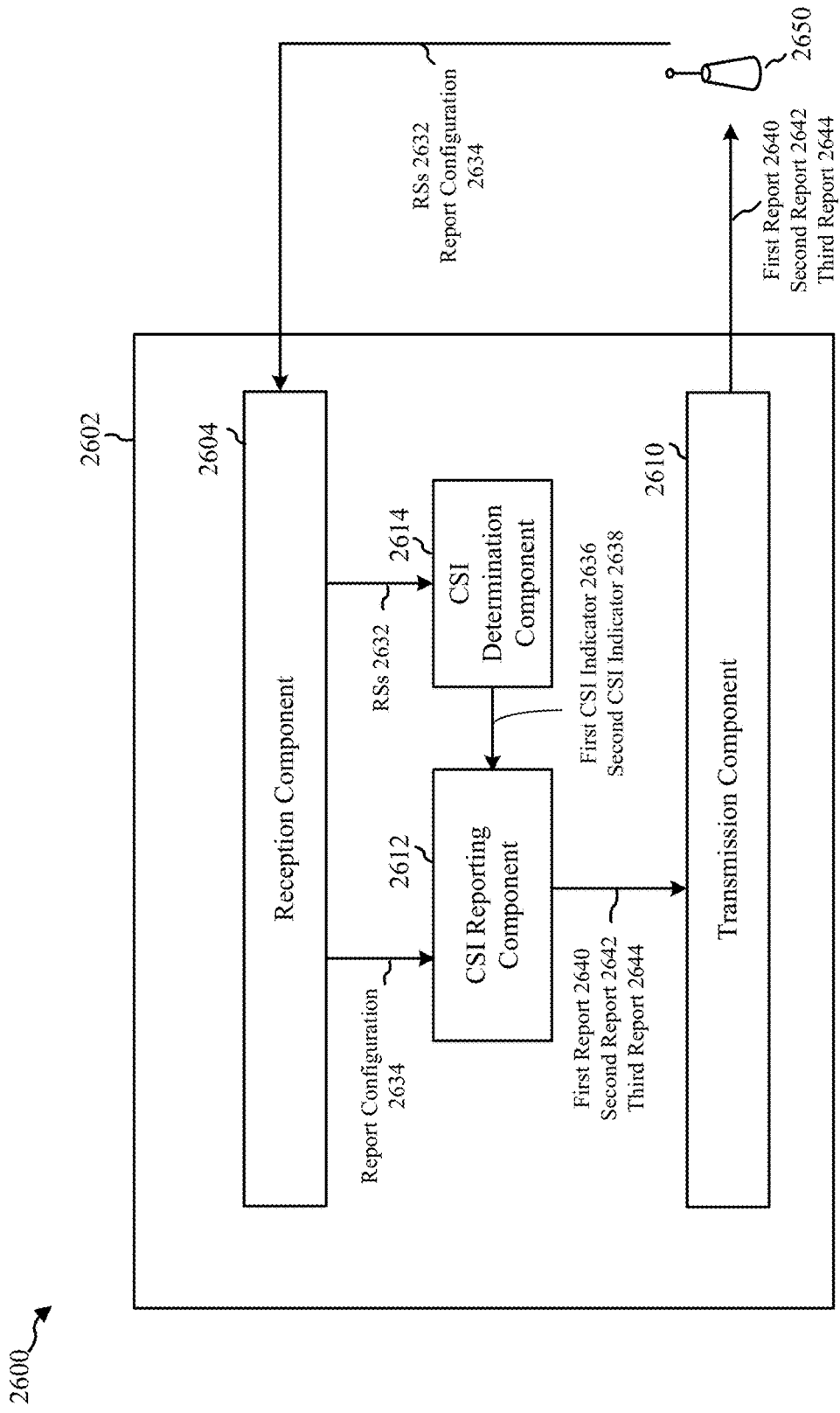
FIG. 26 is a conceptual data flow diagram illustrating the data flow between different components/means in an exemplary apparatus.

FIG. 26 is a conceptual data flow diagram 2600 illustrating the data flow between different components/means in an exemplary apparatus 2602. The apparatus 2602 may a UE (e.g., the UE 712). The apparatus 2602 includes a reception component 2604, a transmission component 2610, a CSI report component 2612, and a CSI determination component 2614. The CSI report component 2612 and the CSI determination component 2614 may constitute the CSI control component 152 and the CSI control component 252.

The apparatus 2602 is in communication with an eNodeB 2650. The reception component 2604 receives RSs 2632 from the eNodeB 2650. The reception component 2604 may also receive a report configuration 2634 from the eNodeB 2650. The reception component 2604 sends the RSs 2632 to the CSI determination component 2614 and sends the report configuration 2634 to the CSI report component 2612.

The CSI determination component 2614 determines, based on the RSs 2632, a first CSI indicator 2636 indicating a first precoding configuration of the eNodeB 2650 optimized to at least one of improve signal power or reduce interference in an elevation dimension. The CSI determination component 2614 determines, based on the RSs 2632, a second CSI indicator 2638 indicating a second precoding configuration of the eNodeB 2650 optimized to at least one of improve the signal power or reduce interference in an azimuth dimension. Further, the CSI determination component 2614 sends the first CSI indicator 2636 and the second CSI indicator 2638 to the CSI report component 2612.

The CSI report component 2612 may determine, at least based in part on the report configuration 2634, a PUCCH reporting mode and corresponding CSI reports for carrying the first CSI indicator 2636 and the second CSI indicator 2638. Accordingly, the CSI report component 2612 constructs a first CSI report 2640 carrying the first CSI indicator 2636 and sends the first CSI report 2640 to the transmission component 2610, which in turn transmits the first CSI report 2640 to the eNodeB 2650. The CSI report component 2612 may construct a second CSI report 2642 carrying the second CSI indicator 2638 and sends the second CSI report 2642 to the transmission component 2610, which in turn transmits the second CSI report 2642 to the eNodeB 2650. The first CSI report 2640 and the second CSI report 2642 may be transmitted alternately.

In certain configurations, the first CSI indicator 2636 includes at least an E-PMI. The second CSI indicator 2638 includes at least an A-PMI. In certain configurations, the first CSI report 2640 is transmitted to the eNodeB 2650 on a PUCCH. In certain configurations, a payload size of the first CSI report 2640 is not greater than 11 information bits.

In certain configurations, the first CSI report 2640 further includes an RI. In certain configurations, the first CSI indicator includes a first E-PMI.

In certain configurations, the first CSI report 2640 further includes the second CSI indicator 2638 and a CQI. In certain configurations, the first CSI indicator 2636 includes a first E-PMI. The second CSI indicator 2638 includes a first A-PMI. The first CSI indicator 2636 and the second CSI indicator 2638 together have no more than 4 information bits.

In certain configurations, the first CSI report 2640 includes a CQI that is determined based on the second CSI indicator 2638 and the first CSI indicator 2636. In certain configurations, the first CSI indicator 2636 and the second CSI indicator 2638 are determined based on the RSs 2632 received in a same subframe. In certain configurations, the first CSI indicator 2636 and the second CSI indicator 2638 are determined based on the RSs 2632 received in different subframes.

In certain configurations, the first CSI report 2640 further includes the second CSI indicator 2638. The first CSI indicator 2636 and the second CSI indicator 2638 together have no more than 6 information bits. In certain configurations, the first CSI indicator 2636 has 2 information bits and the second CSI indicator 2638 has 4 information bits. In certain configurations, the first CSI indicator 2636 includes a first E-PMI. The second CSI indicator 2638 includes a first A-PMI.

In certain configurations, the first CSI report 2640 further includes the second CSI indicator 2638 and a wideband CQI. The first CSI indicator 2636 and the second CSI indicator 2638 together have no more than 4 information bits. In certain configurations, the first CSI indicator 2636 includes a second E-PMI and the second CSI indicator 2638 includes a second A-PMI. In certain configurations, the first CSI report 2640 includes an E-PMI indicator and a data unit. The E-PMI indicator indicates whether the data unit carries an E-PMI or a spatial differential CQI.

In certain configurations, a PUCCH established between the apparatus 2602 and the eNodeB 2650 has a plurality of resources corresponding to a plurality of values. The first CSI report 2640 is transmitted on a resource of the plurality of resources corresponding to a value of the first CSI indicator 2636. In certain configurations, a payload size of the first CSI report 2640 is up to 13 information bits. The first CSI report 2640 is transmitted on a PUCCH using PUCCH format 2. The first CSI report 2640 includes the first CSI indicator 2636, the second CSI indicator 2638, and a CQI. In certain configurations, a payload size of the first CSI report 2640 is up to 22 information bits. The first CSI report 2640 is transmitted on a PUCCH using PUCCH format 3. The first CSI report 2640 includes the first CSI indicator 2636, the second CSI indicator 2638, and a CQI.

The CSI report component 2612 may determine to transmit the first CSI report 2640 and a third CSI report 2644 in a same particular subframe on a PUCCH. The CSI report component 2612 determines whether the first CSI report 2640 has a priority higher than that of the third CSI report 2644 based on a priority rule.

When the first CSI report 2640 is determined to have a priority higher than that of the third CSI report 2644, the CSI report component 2612 may construct a first CSI report 2640 carrying the second CSI indicator 2638 and sends the first CSI report 2640 to the transmission component 2610, which in turn transmits the first CSI report 2640 to the eNodeB 2650 in the particular subframe. When the first CSI report 2640 is determined to have a priority not higher than that of the third CSI report 2644, the CSI report component 2612 may construct the third CSI report 2644 and sends the third CSI report 2644 to the transmission component 2610, which in turn transmits the third CSI report 2644 to the eNodeB 2650 in the particular subframe.

The priority rule defines that, within a same serving cell, a CSI report carrying an RI has a priority higher than that of a CSI report not carrying an RI. The priority rule also defines, within different serving cells, a CSI report carrying an RI and one of a first A-PMI and a first E-PMI and a CSI report carrying both a first A-PMI and a first E-PMI each have a priority higher than that of a CSI report not carrying (i) an RI and one of an A-PMI and an E-PMI or (ii) both a first A-PMI and a first E-PMI.

The apparatus may include additional components that perform each of the blocks of the algorithm in the aforementioned flowcharts of FIGS. 20-25. As such, each block in the aforementioned flowcharts of FIGS. 20-25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 27:
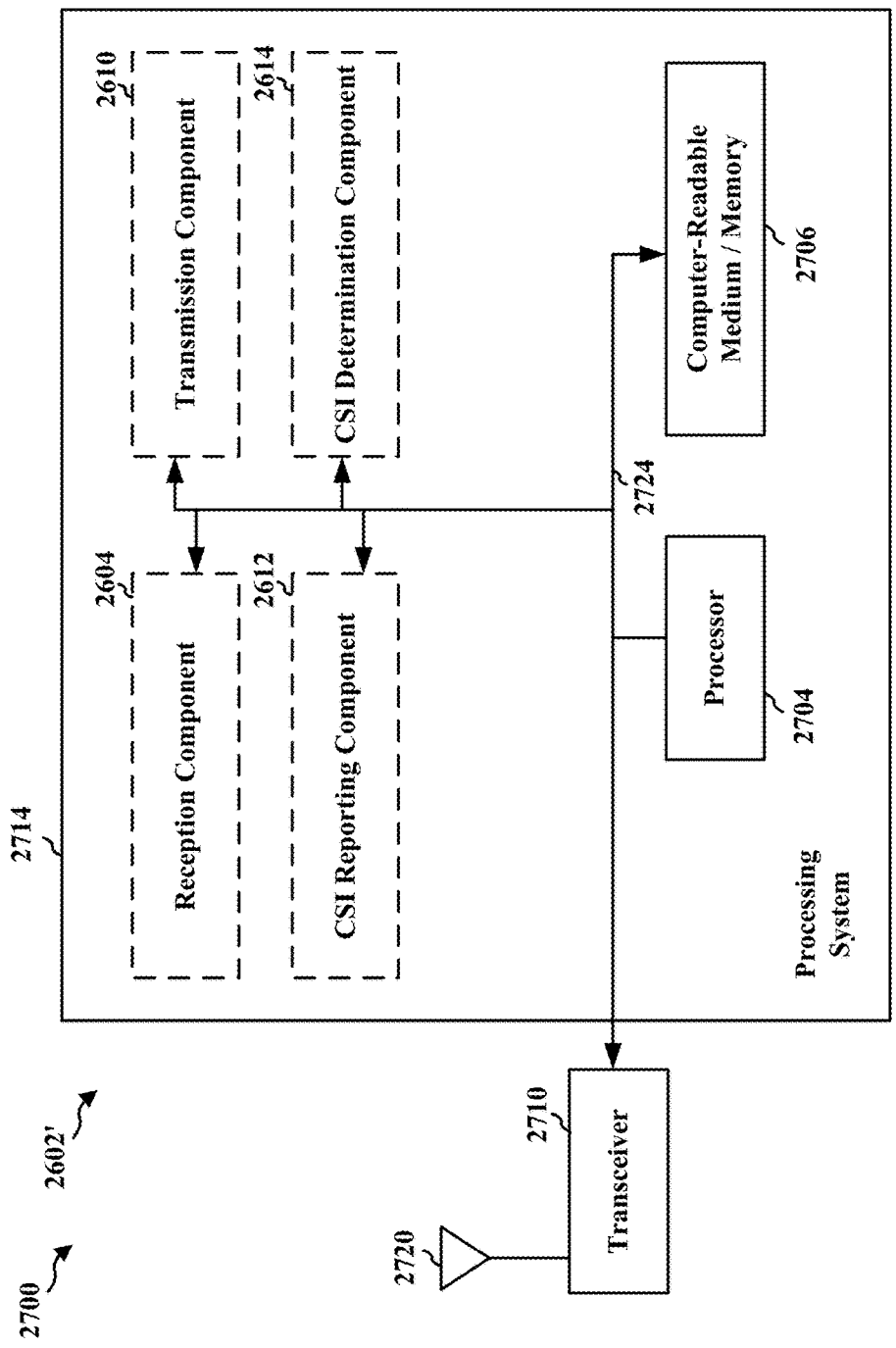
FIG. 27 is a diagram illustrating an example of a hardware implementation for an apparatus employing a processing system.

FIG. 27 is a diagram 2700 illustrating an example of a hardware implementation for an apparatus 2602' employing a processing system 2714. The processing system 2714 may be implemented with a bus architecture, represented generally by the bus 2724. The bus 2724 may include any number of interconnecting buses and bridges depending on the specific application of the processing system 2714 and the overall design constraints. The bus 2724 links together various circuits including one or more processors and/or hardware components, represented by the processor 2704, the components 2604, 2610, 2612, 2614, and the computer-readable medium/memory 2706. The bus 2724 may also link various other circuits such as timing sources, peripherals, voltage regulators, and power management circuits, which are well known in the art, and therefore, will not be described any further.

The processing system 2714 may be coupled to a transceiver 2710. The transceiver 2710 is coupled to one or more antennas 2720. The transceiver 2710 provides a means for communicating with various other apparatus over a transmission medium. The transceiver 2710 receives a signal from the one or more antennas 2720, extracts information from the received signal, and provides the extracted information to the processing system 2714, specifically the reception component 2604. In addition, the transceiver 2710 receives information from the processing system 2714, specifically the transmission component 2610, and based on the received information, generates a signal to be applied to the one or more antennas 2720. The processing system 2714 includes a processor 2704 coupled to a computer-readable medium/memory 2706. The processor 2704 is responsible for general processing, including the execution of software stored on the computer-readable medium/memory 2706. The software, when executed by the processor 2704, causes the processing system 2714 to perform the various functions described supra for any particular apparatus. The computer-readable medium/memory 2706 may also be used for storing data that is manipulated by the processor 2704 when executing software. The processing system further includes at least one of the components 2604, 2610, 2612, 2614. The components may be software components running in the processor 2704, resident/stored in the computer readable medium/memory 2706, one or more hardware components coupled to the processor 2704, or some combination thereof. The processing system 2714 may be a component of the UE 650 and may include the memory 660 and/or at least one of the TX processor 668, the RX processor 656, and the controller/processor 659.

The apparatus 2602/2602' may be configured to include means for receiving RSs from a base station. The apparatus 2602/2602' may be configured to include means for determining, based on the RSs, a second CSI indicator indicating a first precoding configuration of the base station optimized to at least one of improve signal power or reduce interference in an elevation dimension. The apparatus 2602/2602' may be configured to include means for determining, based on the RSs, a second CSI indicator indicating a second precoding configuration of the base station optimized to at least one of improve the signal power or reduce interference in an azimuth dimension. The apparatus 2602/2602' may be configured to include means for transmitting, to the base station, a first CSI report including the first CSI indicator. In certain configurations, the apparatus 2602/2602' may be configured to include means for transmitting, to the base station, a second CSI report including the second CSI indicator. The first CSI report and the second CSI report are transmitted alternately.

In certain configurations, the first CSI indicator includes at least an E-PMI. The second CSI indicator includes at least an A-PMI. In certain configurations, the first CSI report is transmitted to the base station on a PUCCH. In certain configurations, a payload size of the first CSI report is not greater than 11 information bits.

In certain configurations, the first CSI report further includes an RI. In certain configurations, the first CSI indicator includes a first E-PMI.

In certain configurations, the first CSI report further includes the second CSI indicator and a CQI. In certain configurations, the first CSI indicator includes a first E-PMI. The second CSI indicator includes a first A-PMI. The first CSI indicator and the second CSI indicator together have no more than 4 information bits.

In certain configurations, the first CSI report includes a CQI that is determined based on the second CSI indicator and the first CSI indicator. In certain configurations, the first CSI indicator and the second CSI indicator are determined based on the RSs received in a same subframe. In certain configurations, the first CSI indicator and the second CSI indicator are determined based on the RSs received in different subframes.

In certain configurations, the first CSI report further includes the second CSI indicator. The first CSI indicator and the second CSI indicator together have no more than 6 information bits. In certain configurations, the first CSI indicator has 2 information bits and the second CSI indicator has 4 information bits. In certain configurations, the first CSI indicator includes a first E-PMI. The second CSI indicator includes a first A-PMI.

In certain configurations, the first CSI report further includes the second CSI indicator and a wideband CQI. The first CSI indicator and the second CSI indicator together have no more than 4 information bits. In certain configurations, the first CSI indicator includes a second E-PMI and the second CSI indicator includes a second A-PMI. In certain configurations, the first CSI report includes an E-PMI indicator and a data unit. The E-PMI indicator indicates whether the data unit carries an E-PMI or a spatial differential CQI.

In certain configurations, a PUCCH established between the UE and the base station has a plurality of resources corresponding to a plurality of values. The first CSI report is transmitted on a resource of the plurality of resources corresponding to a value of the first CSI indicator. In certain configurations, a payload size of the first CSI report is up to 13 information bits. The first CSI report is transmitted on a PUCCH using PUCCH format 2. The first CSI report includes the first CSI indicator, the second CSI indicator, and a CQI. In certain configurations, a payload size of the first CSI report is up to 22 information bits. The first CSI report is transmitted on a PUCCH using PUCCH format 3. The first CSI report includes the first CSI indicator, the second CSI indicator, and a CQI.

In certain configurations, the apparatus 2602/2602' may be configured to include means for determining to transmit the first CSI report and a third CSI report in a same particular subframe on a PUCCH. The apparatus 2602/2602' may be configured to include means for determining whether the first CSI report has a priority higher than that of the third CSI report based on a priority rule. The first CSI report is transmitted in the particular subframe when the first CSI report is determined to have a priority higher than that of the third CSI report.

The priority rule defines that, within a same serving cell, a CSI report carrying an RI has a priority higher than that of a CSI report not carrying an RI. The priority rule also defines, within different serving cells, a CSI report carrying an RI and one of a first A-PMI and a first E-PMI and a CSI report carrying both a first A-PMI and a first E-PMI each have a priority higher than that of a CSI report not carrying (i) an RI and one of an A-PMI and an E-PMI or (ii) both a first A-PMI and a first E-PMI.

The aforementioned means may be one or more of the aforementioned components of the apparatus 2602 and/or the processing system 2714 of the apparatus 2602' configured to perform the functions recited by the aforementioned means. As described supra, the processing system 2714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
   receiving reference signals (RSs) from a base station, the base station comprising an antenna array including a long axis;
   determining, based on the RSs, a first channel state information (CSI) indicator indicating a first precoding configuration of the base station, the first precoding configuration optimized to at least one of improve transmitted signal power, improve received signal power, or reduce interference in an elevation dimension, wherein the elevation dimension is parallel to the long axis of the antenna array of the base station;
   determining, based on the RSs, a second CSI indicator indicating a second precoding configuration of the base station, the second precoding configuration optimized to at least one of improve the transmitted signal power, improve the received signal power, or reduce interference in an azimuth dimension, wherein the azimuth dimension is perpendicular to the long axis of the antenna array of the base station;
   transmitting, to the base station, a first CSI report including at least the first CSI indicator and a channel quality indicator (CQI), wherein the first CSI report includes an E-PMI indicator and a data unit, and wherein the E-PMI indicator indicates whether the data unit carries an E-PMI or a spatial differential channel quality indicator (CQI); and transmitting, to the base station, a second CSI report including the second CSI indicator, wherein the first CSI report and the second CSI report are transmitted alternately.

2. The method of claim 1, wherein the first CSI indicator includes at least an elevation precoding matrix indicator (E-PMI), and wherein the second CSI indicator includes at least an azimuth precoding matrix indicator (A-PMI).

3. The method of claim 1, wherein the first CSI report is transmitted to the base station on a physical uplink control channel (PUCCH).

4. The method of claim 1, wherein a payload size of the first CSI report is less than or equal to 11 information bits.

5. The method of claim 1, wherein the first CSI report further includes a rank indicator (RI).

6. The method of claim 5, wherein the first CSI indicator includes a first elevation precoding matrix indicator (E-PMI).

7. The method of claim 1, wherein the first CSI indicator includes a first elevation precoding matrix indicator (E-PMI), wherein the second CSI indicator includes a first azimuth precoding matrix indicator (A-PMI).

8. The method of claim 1, wherein the first CSI report includes a channel quality indicator (CQI) that is determined based on the second CSI indicator and the first CSI indicator.

9. The method of claim 1, wherein the first CSI indicator and the second CSI indicator are determined based on the RSs received in a same subframe.

10. The method of claim 1, wherein the first CSI indicator and the second CSI indicator are determined based on the RSs received in different subframes.

11. The method of claim 1, wherein the first CSI indicator includes a second elevation precoding matrix indicator (E-PMI) and the second CSI indicator includes a second azimuth precoding matrix indicator (A-PMI).

12. The method of claim 1, wherein a physical uplink control channel (PUCCH) established between the UE and the base station has a plurality of resources corresponding to a plurality of values, and wherein the first CSI report is transmitted on a resource of the plurality of resources corresponding to a value of the first CSI indicator.

13. The method of claim 1, wherein a payload size of the first CSI report is up to 13 information bits, wherein the first CSI report is transmitted on a physical uplink control channel (PUCCH) using PUCCH format 2, wherein the first CSI report includes the first CSI indicator, the second CSI indicator, and a channel quality indicator (CQI).

14. The method of claim 1, wherein a payload size of the first CSI report is up to 22 information bits, wherein the first CSI report is transmitted on a physical uplink control channel (PUCCH) using PUCCH format 3, and wherein the first CSI report includes the first CSI indicator, the second CSI indicator, and a channel quality indicator (CQI).

15. An apparatus for wireless communication, the apparatus being a user equipment (UE), comprising:
   means for receiving reference signals (RSs) from a base station, the base station comprising an antenna array including a long axis;
   means for determining, based on the RSs, a first channel state information (CSI) indicator indicating a first precoding configuration of the base station, the first precoding configuration optimized to at least one of improve transmitted signal power, improve received signal power, or reduce interference in an elevation dimension, wherein the elevation dimension is parallel to the long axis of the antenna array of the base station;
   means for determining, based on the RSs, a second CSI indicator indicating a second precoding configuration of the base station, the second precoding configuration optimized to at least one of improve the transmitted signal power, improve the received signal power, or reduce interference in an azimuth dimension, wherein the azimuth dimension is perpendicular to the long axis of the antenna array of the base station;
   means for transmitting, to the base station, a first CSI report including at least the first CSI indicator and a channel quality indicator (CQI)), wherein the first CSI report includes an E-PMI indicator and a data unit, and wherein the E-PMI indicator indicates whether the data unit carries an E-PMI or a spatial differential channel quality indicator (CQI); and
   means for transmitting, to the base station, a second CSI report including the second CSI indicator, wherein the first CSI report and the second CSI report are transmitted alternately.

16. The apparatus of claim 15, wherein the first CSI indicator includes at least an elevation precoding matrix indicator (E-PMI), and wherein the second CSI indicator includes at least an azimuth precoding matrix indicator (A-PMI).

17. The apparatus of claim 15, wherein the first CSI report is transmitted to the base station on a physical uplink control channel (PUCCH).

18. The apparatus of claim 15, wherein a payload size of the first CSI report is less than or equal to 11 information bits.

19. The apparatus of claim 15, wherein the first CSI report further includes a rank indicator (RI).

20. The apparatus of claim 19, wherein the first CSI indicator includes a first elevation precoding matrix indicator (E-PMI).

21. An apparatus for wireless communication, the apparatus being a user equipment (UE), comprising:
   a memory; and
   at least one processor coupled to the memory and configured to:
      receive reference signals (RSs) from a base station, the base station comprising an antenna array including a long axis;
      determine, based on the RSs, a first channel state information (CSI) indicator indicating a first precoding configuration of the base station, the first precoding configuration optimized to at least one of improve transmitted signal power, improve received signal power, or reduce interference in an elevation dimension, wherein the elevation dimension is parallel to the long axis of the antenna array of the base station;
      determine, based on the RSs, a second CSI indicator indicating a second precoding configuration of the base station, the second precoding configuration optimized to at least one of improve the transmitted signal power, improve the received signal power, or reduce interference in an azimuth dimension, wherein the azimuth dimension is perpendicular to the long axis of the antenna array of the base station;
      transmit, to the base station, a first CSI report including at least the first CSI indicator and a channel quality indicator (CQI)), wherein the first CSI report includes an E-PMI indicator and a data unit, and wherein the E-PMI indicator indicates whether the data unit carries an E-PMI or a spatial differential channel quality indicator (CQI); and transmit, to the base station, a second CSI report including the second CSI indicator, wherein the first CSI report and the second CSI report are transmitted alternately.

22. A non-transitory computer-readable medium storing computer executable code for wireless communication at a user equipment (UE), comprising code for:

receiving reference signals (RSs) from a base station, the base station comprising an antenna array including a long axis;

determining, based on the RSs, a first channel state information (CSI) indicator indicating a first precoding configuration of the base station, the first precoding configuration optimized to at least one of improve transmitted signal power, improve received signal power, or reduce interference in an elevation dimension, wherein the elevation dimension is parallel to the long axis of the antenna array of the base station;

determining, based on the RSs, a second CSI indicator indicating a second precoding configuration of the base station, the second precoding configuration optimized to at least one of improve the signal power or reduce interference in an azimuth dimension, wherein the azimuth dimension is perpendicular to the long axis of the antenna array of the base station;

transmitting, to the base station, a first CSI report including at least the first CSI indicator and a channel quality indicator (CQI)), wherein the first CSI report includes an E-PMI indicator and a data unit, and wherein the E-PMI indicator indicates whether the data unit carries an E-PMI or a spatial differential channel quality indicator (CQI); and transmitting, to the base station, a second CSI report including the second CSI indicator, wherein the first CSI report and the second CSI report are transmitted alternately.

* * * * *